US012764021B2

(12) United States Patent
Juneja et al.

(10) Patent No.: US 12,764,021 B2
(45) Date of Patent: Oct. 13, 2026

(54) RECONCILER ENGINE(S) FOR MANAGING EXTERNAL RESOURCES WITHIN A CLOUD-BASED ENVIRONMENT

(71) Applicant: Oracle International Corporation, Redwood City, CA (US)

(72) Inventors: Rohit Juneja, Stittsville (CA); Sandesh Pai, Chelmsford, MA (US)

(73) Assignee: Oracle International Corporation, Redwood City, CA (US)

( * ) Notice: Subject to any disclaimer, the term of this patent is extended or adjusted under 35 U.S.C. 154(b) by 15 days.

(21) Appl. No.: 18/802,623

(22) Filed: Aug. 13, 2024

(65) Prior Publication Data

US 2026/0052065 A1 Feb. 19, 2026

(51) Int. Cl.

| | |
|---|---|
| ***H04L 45/02*** | (2022.01) |
| ***G06F 9/50*** | (2006.01) |
| ***H04L 9/40*** | (2022.01) |
| ***H04L 41/0823*** | (2022.01) |
| ***H04L 41/0895*** | (2022.01) |
| ***H04L 41/0897*** | (2022.01) |

(52) U.S. Cl.

CPC ........ *H04L 41/0823* (2013.01); *G06F 9/5077* (2013.01); *H04L 41/0895* (2022.05); *H04L 41/0897* (2022.05)

(58) Field of Classification Search

CPC ............. H04L 41/0895; H04L 41/0823; H04L 41/0897; G06F 9/5077

See application file for complete search history.

(56) References Cited

U.S. PATENT DOCUMENTS

| | | | | |
|---|---|---|---|---|
| 2022/0158926 | A1* | 5/2022 | Wennerström | H04L 43/20 |
| 2022/0417093 | A1* | 12/2022 | Lindholm | H04L 61/5007 |
| 2023/0068221 | A1* | 3/2023 | Magowan | H04L 9/3247 |
| 2024/0031265 | A1* | 1/2024 | Sui | H04L 43/06 |
| 2024/0080277 | A1* | 3/2024 | Lee | H04L 67/60 |
| 2024/0143365 | A1* | 5/2024 | Nguyen | G06F 9/45545 |

* cited by examiner

*Primary Examiner* — Christopher B Robinson
*Assistant Examiner* — Ho T Shiu

(57) ABSTRACT

Various embodiments of the present technology generally relate to a VnicSet operator system containing instructions to implement a process to manage a virtual network interface controller (Vnic) on an application pod of a containerized software environment, the Vnic being directly reachable from a network external to the containerized software environment. In an aspect, the VnicSet operator may include a reconciler engine that determines one or more reconciliation actions for one or more Vnics. The reconciler engine may determine a first reconciliation action for a first worker node and acquire a node lock for the first worker node based on the first reconciliation action. Responsive to acquiring the node lock, the reconciler engine may transmit a first reconciliation action request to a cloud provider, where the cloud provider performs the first reconciliation action responsive to receiving the first reconciliation action request.

20 Claims, 11 Drawing Sheets

RECONCILER ENGINE(S) FOR MANAGING EXTERNAL RESOURCES WITHIN A CLOUD-BASED ENVIRONMENT

TECHNICAL FIELD

Various embodiments of the present technology generally relate to improvements to the capabilities of a software container environment, such as Kubernetes® (sometimes stylized as K8s). More specifically, embodiments of the present technology relate to systems and methods for improved network functionality in a cloud-based environment, such as to implement a reconciler engine for improved management and coordination of external resources within a cloud-based environment.

BACKGROUND

In the modern era, organizations are increasingly relying on cloud-native architectures, and as such, they are turning to containerized software deployment and orchestration platforms like Kubernetes. These platforms are essential for managing the complex lifecycle of containerized applications, providing capabilities such as automated deployment, scaling, and operations across clusters of hosts. They ensure that applications are highly available and resilient by distributing workloads, monitoring the health of applications, and performing automatic restarts and failovers when necessary. Additionally, they simplify resource management and optimize the use of computing power, enabling organizations to run applications efficiently and cost-effectively. With the growing demand for speed, scalability, and reliability in software development and deployment, containerized orchestration platforms have become a cornerstone of modern IT infrastructure.

To achieve these capabilities, Kubernetes relies on cloud platforms or providers like OpenStack to deliver the underlying infrastructure services needed for containerized environments. Cloud providers offer compute instances, block storage, and networking resources that Kubernetes uses to deploy and manage containers effectively. OpenStack, in particular, provides a robust set of infrastructure services, including virtual machines (compute instances), scalable storage solutions (block storage), and flexible networking options. This integration between Kubernetes and cloud providers like OpenStack enables organizations to leverage the scalability and flexibility of cloud infrastructure, ensuring that containerized applications can run smoothly and efficiently. By combining Kubernetes' powerful orchestration capabilities with the comprehensive infrastructure services provided by cloud providers, organizations can build a modern, resilient, and scalable IT infrastructure that meets the demands of today's dynamic business environment.

One shortcoming in the integration between current containerized software platforms like Kubernetes and cloud providers such as OpenStack is the lack of efficient management and coordination of external resources between the two systems. These inefficiencies can lead to delays in resource provisioning, such as the attachment and detachment of storage volumes, and the allocation of compute instances. When Kubernetes requests resources from OpenStack, any latency or bottlenecks in the communication and execution of these requests can cause significant application delays. This can result in slower deployment times, hindered scalability, and reduced overall performance. Additionally, the lack of seamless integration and coordination can lead to resource contention and suboptimal utilization, ultimately impacting the reliability and availability of applications. Such inefficiencies underscore the need for more streamlined and tightly integrated solutions to ensure that containerized applications can fully leverage the capabilities of cloud infrastructure without compromising on speed and efficiency.

Accordingly, there is a need for improved systems and techniques to effectively and efficiently integrate, manage, and coordinate external resources within the containerized software environment. In particular, there is a need for reconciler engines as provided herein for managing reconciliation actions for external resources and coordinating reconciliation actions requests submitted to a cloud provider to efficiently optimize application loading, restarting, and scaling activities.

The information provided in this section is presented as background information and serves only to assist in any understanding of the present disclosure. No determination has been made and no assertion is made as to whether any of the above might be applicable as prior art with regard to the present disclosure.

OVERVIEW

Technology is disclosed herein for systems and techniques for providing reconciler engines for managing virtual network interface controller or cards (Vnics) created for deployment within containerized software environments. In particular, the reconciler engine, and its related functions provided herein, manage the reconciliation processes between the containerized software environment and respective cloud provider, such as OpenStack. As will be expanded on in greater detail below, Vnics may be used to provide direct access to an application pod or microservice running within a containerized environment, such as Kubernetes. As application needs change, pods may be created or deleted, and as such, respective worker nodes on which Vnics are injected may be created or deleted. To efficiently adjust the underlying infrastructure responsive to any changes, a reconciler engine may coordinate reconciliation actions with the respective cloud provider, such as OpenStack.

To coordinate reconciliation actions, the reconciler engine may include a main reconciler module and a clean-up module. When an event is detected, the reconciler engine may determine one or more reconciliation actions based on the event. For example, the main reconciler module may determine whether a detach action or an attach action is required based on the event. If a detach action is determined, the main reconciler module may mark a respective worker node with a tombstone marker, indicating that a detach action is to be performed for the worker node. In contrast, if the main reconciler module determines that that an attach action is required, then the main reconciler module may acquire an attach lock on the respective worker node, and in some cases, acquire a node lock on the worker node. The node lock may prevent the clean-up module from performing any actions with respect to the worker node.

When a reconciliation action includes a detach action, the clean-up module may detach a tombstone marker on a respective worker node and determine the respective detach actions to be performed. Responsive to determining the detach actions, the clean-up module may acquire a node lock on the respective module and check to see if there is an attach lock on the worker node. If there is an attach lock on the worker node, the clean-up module may release the node lock to allow the main reconciler module to perform the attach action. However, if no attach lock is detected, then the clean-up module may proceed with the detach actions.

To perform the respective attach and detach actions, the reconciler engine may generate and transmit a request to the cloud provider. As will be described in greater detail below, the reconciler engine may manage the reconciliation actions on a per node basis to minimize external resource leakage. As such, each module within the reconciler engine may perform each action individually, validating that a respective request is completed before continuing to a subsequent action. Additionally, the clean-up module may check for the presence of an attach lock in between each request to ensure that attach requests are prioritized.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

FIG. 6 illustrates an operational environment including a VnicSet operator containing a reconciler engine, according to an embodiment herein;

Figure 1:
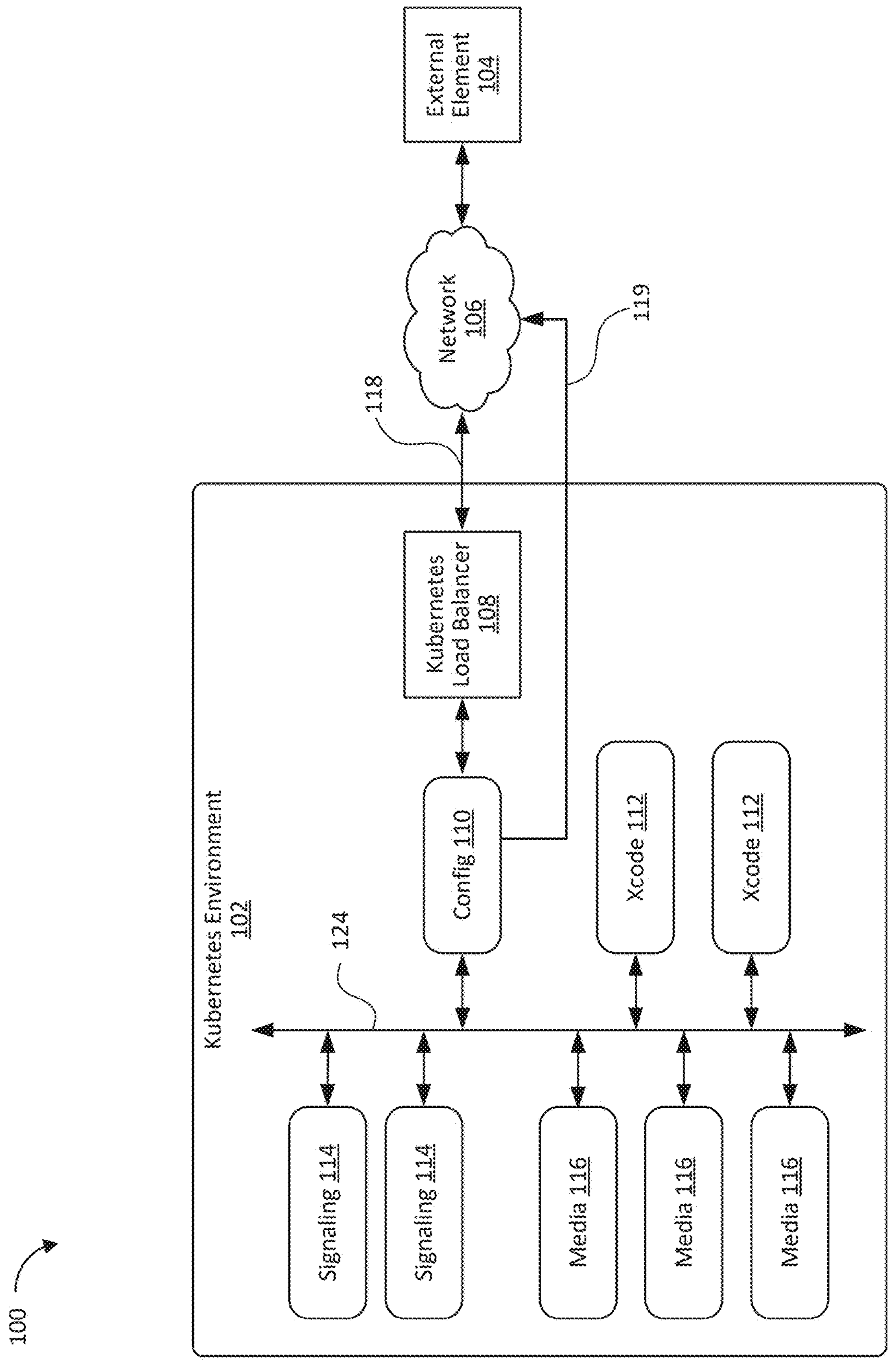
FIG. 1 illustrates an example system configured to implement cloud network service management, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Containerized software environments, exemplified by platforms like Kubernetes, are experiencing a surge in popularity for several compelling reasons. Firstly, they offer unparalleled agility and scalability, allowing developers to package applications and their dependencies into portable, lightweight containers that can run consistently across various environments. This consistency streamlines the development, testing, and deployment processes, accelerating time-to-market and enhancing operational efficiency. Additionally, containerization promotes resource utilization optimization, enabling organizations to maximize infrastructure investments and efficiently manage computational resources. Moreover, Kubernetes, with its robust orchestration capabilities, automates the deployment, scaling, and management of containerized applications, simplifying complex tasks and reducing operational overhead. This combination of flexibility, efficiency, and automation makes containerized software environments like Kubernetes indispensable in modern software development and deployment landscapes, driving their widespread adoption across industries.

To provide direct access to microservices or application pods within the Kubernetes environment, virtual network interface controllers or cards (Vnics) may be created and injected into respective application pods. As will be described in greater detail below, these Vnics provide a direct communication channel between the application pods and external networks. To implement and manage Vnics, custom operators, such as a VnicSet operator, may be deployed within the Kubernetes environment. Example Vnics and VnicSet operators are described in U.S. application Ser. No. 18/351,810, titled CLOUD BASED NETWORK FUNCTION, U.S. application Ser. No. 18/351,835, titled VIRTUAL IP FOR A CONTAINER POD, and U.S. application Ser. No. 18/351,861, titled CLOUD NETWORK SERVICE MANAGEMENT, U.S. application Ser. No. 18/666,484, titled AUDIT ENGINE(S) FOR MONITORING AND MANAGING VIRTUAL NETWORK INTERFACE CONTROLLERS WITHIN A CLOUD-BASED ENVIRONMENT, each of which is incorporated by reference herein.

When a custom resource operator, such as a VnicSet operator, is implemented within Kubernetes and interacts with OpenStack, it performs reconciling actions by translating the desired state of custom resources, such as Vnics, into specific operations on OpenStack's infrastructure. For example, if a Kubernetes custom resource represents a set of virtual machines or block storage volumes managed by OpenStack, the operator monitors changes to these resources, such as scaling requests or configuration updates. Upon detecting a change, the operator communicates with OpenStack's API to adjust the corresponding infrastructure components. This might involve provisioning new virtual machines, adjusting network configurations, or managing storage volumes to align with the updated specifications.

The operator ensures that the actual state of OpenStack resources matches the desired state defined in Kubernetes, automating tasks such as instance creation, scaling, and resource optimization. By bridging Kubernetes and OpenStack, the operator streamlines the management of cloud resources, reducing manual intervention and enabling seamless, automated adjustments that keep the infrastructure in sync with the evolving needs of containerized applications.

One shortcoming of current coordination approaches between Kubernetes and OpenStack is the requirement for OpenStack to serialize attach and detach requests for Kubernetes resources. OpenStack's handling of these requests in a serialized manner means that only one attach or detach operation can be processed at a time per node, leading to potential bottlenecks and delays. This serialization can cause significant issues for Kubernetes applications, particularly during high-demand or restart scenarios or when scaling operations are frequent. Due to OpenStack's variable timing in servicing these requests, there can be substantial delays in application loading, restarting, and scaling activities. For example, if multiple pods on the same node request volume attachments simultaneously, each request must wait for the previous one to be completed. This can result in slower deployment times, extended periods of unavailability, and overall reduced responsiveness of applications. These delays undermine the efficiency and agility that Kubernetes aims to provide, highlighting a critical area for improvement in the integration between Kubernetes and OpenStack.

To address at least these shortcomings, an example reconciler engine is provided herein for managing external resources, such as Vnics, within cloud-based environments. In particular, the reconciler engine may manage and coordinate reconciliation actions, such as attach and detach actions for external resources implemented within a containerized software environment, such as Kubernetes, with a cloud provider, such as OpenStack. As will be described in greater detail below, the reconciler engine may include a main reconciler module and a clean-up module. The main reconciler module may manage attach actions, and the clean-up module may manage detach actions.

In some embodiments, the reconciler module and the clean-up module may coordinate the reconciliation actions on a per worker node basis, instead of on a per cluster basis. Under conventional approaches, reconciliation actions are sent by operators to the cloud provider on a per-cluster basis. Because the cloud provider processes these requests serially—only handling subsequent requests after the previous one is fully processed—this approach can lead to significant issues. Serial processing increases the risk of external resource database corruption, resource leaks, or failures, especially when there is a high volume of requests or when requests involve complex resource dependencies. Any delay or failure in processing a request can cascade, leading to inconsistencies and potential errors in the resource state. By sending reconciliation actions on a per-worker node basis, the reconciler engine addresses these issues by distributing the load more evenly and allowing for parallel processing of requests. Accordingly, the reconciler engine reduces the risk of bottlenecks, enhances resource management efficiency, and improves the overall stability and reliability of the cloud environment.

Additionally, the main reconciler module and the clean-up module of the reconciler engine may prioritize attach actions over detach actions, thereby reducing loading and scaling time for a respective application over conventional approaches. By prioritizing attach actions, the reconciler engine, may significantly enhance application start-up and scaling activities by ensuring that critical resources, such as storage volumes and network interfaces, are available more quickly. This prioritization minimizes delays in resource allocation, allowing applications to start and scale more efficiently. As a result, workloads can be balanced and adjusted in real-time to meet demand, improving performance and responsiveness. Accordingly, the reconciler engine provided herein streamlines resource management, reduces latency, and enhances the overall reliability of the cloud infrastructure.

By addressing the serialization issues present in current cloud-based environments, the reconciler engine improves the overall performance and efficiency of cloud-based applications. As noted above, serialization delays in cloud providers can significantly impact the speed at which applications load, restart, and scale within a containerized software environment. As such, by resolving these issues, the reconciler engine can provide faster application startup times, reduce downtime during restarts, and enhance the scalability of applications to meet dynamic workloads more effectively. This optimization not only enhances user experience by providing more responsive applications but also improves resource utilization and operational efficiency, leading to cost savings and more robust cloud infrastructure. Furthermore, the reconciler engine facilitates seamless integration between containerized software environments like Kubernetes and cloud providers like OpenStack, thereby ensuring a more cohesive and reliable deployment pipeline, facilitating smoother continuous integration and continuous deployment (CI/CD) processes.

Turning now to the Figures, FIG. 1 illustrates an example system 100 configured to implement cloud network service management, according to an embodiment herein. The system 100 may include one or more Kubernetes containerized software environments 102, one or more external elements 104, and one or more networks 106. The Kubernetes environment 102 may include a load balancer module 108, and one or more microservices, applications, or computing pods, such as configuration module 110, transcoding (xcode) module 112, signaling module 114, and media module 116. The modules within Kubernetes environment 102 may communicate via an internal pod networking 124 path. Elements of the Kubernetes environment 102 may be connected to external network 106 via an ingress path 118 into the Kubernetes environment 102, and an egress path 119 out of the Kubernetes environment. Elements of system 100 may be implemented via computers, servers, hardware and software modules, or other system components. Elements of system 100 may also include or have access to one or more data storage devices, data storage mediums, data storage servers, and related data structures such as databases, which may store data files, executable code, or other information.

In the Kubernetes environment 102, applications or microservices may be executed by pods, which may be a unit of computing. In system 100, various microservices, such as config 110, transcoding 112, signaling 114, and media 116, may be executed on one or more pods in the Kubernetes environment 102. These microservices may be used for managing and processing communication streams for a mobile communications network provider. For example, external element 104 may include a communications device or networking component involved in a communication session. Media from external element 104 may be transmitted via network 106 (e.g., the internet or some other data network external to the Kubernetes environment 102) along an ingress path 118 to the Kubernetes environment 102.

The ingress path 118 may pass through a Kubernetes load balancer 108, before the communications messages are provided to a pod or application such as config module 110. The load balancer 108 may perform processing on incoming messages to distribute workload among resources within the Kubernetes environment 102, and in a default Kubernetes setup may always be situated along the ingress path 118 for network communications. From the perspective of a mobile communications service provider, the additional overhead of the load balancer 108 may be undesirable for real-time transport protocol (RTP) and user datagram protocol (UDP) traffic. Data from network 106 intended for a particular microservice 110-116 may need to go through load balancer 108 first, and potentially be routed through Kubernetes' internal pod network 124. Pods may only have one interface (e.g., to Kubernetes pod network 124), and trusted and untrusted segregation cannot be implemented at the network level. Therefore, external communications (e.g., from network 106) may not be able to reach a desired microservice or pod directly. IP addresses for pods may be ephemeral (e.g., generated based on a need and dissolved afterward), so that it is not known ahead of time what the IP address for a pod will be, and if the pod or application is restarted, the IP address may change. The default Kubernetes pod interface may be low capacity and not suited for media traffic, such as VoIP and IP video communications streams, and may not run accelerated networking technologies such as single root I/O virtualization (SR-IOV or SRIOV) or data plane development kit (DPDK). Further, messaging exiting the Kubernetes environment 102 may be along an egress path 119 different than the ingress path 118, bypassing the load balancer 108.

To allow an additional access to the application pods within the Kubernetes environment 102, outside of the ingress path 118 and the egress path 119, additional interfaces may be added to the application pods. In particular, a virtual network interface controller or card (Vnic) may be injected into the Kubernetes environment 102, specifically into a respective pod or microservice 110-116) to allow external work or communications (e.g., from the network 106) to reach the microservices 110-116 directly via externally reachable IP support, and the IP address for the microservices can be known beforehand. As those skilled in the art readily appreciate, a Vnic is a software-based representation of a physical network interface card within a virtualized environment. In traditional physical networking, a network interface card (NIC) is a hardware component that connects a computer or server to a network, allowing it to send and receive data over that network. However, in virtualized environments such as virtual machines (VMs) or containerized environments, Vnics are used to provide networking capabilities to virtualized instances. A Vnic operates similarly to a physical NIC but exists purely in software. As such, the Vnic has its own unique identifier and configuration settings, including IP address, subnet mask, and routing information. Vnics allow virtualized instances, such as VMs or containers, to communicate with each other and with external networks just like physical machines. As such, when injected into an application pod, the Vnic allows external networks, such as the network 106 to directly connect with the pod.

In an example, a Vnic may provide a known IP address reachable from an external network in handling a session initiation protocol (SIP) phone call, where a signaling path will be set up. The IP address for microservices 110-116 may be configured to stay consistent even after the pod or microservice restarts or fails. As such, a Vnic may provide the same ingress and egress path via a direct connection between pods and external networks 106. An example use case in which maintaining the same ingress and egress path may be important involves handling media packets in RTP communications, where media packets should come in and go out along the same media path.

Additionally, Vnics may provide support for virtual IP (VIP) addressing. With the additional interfaces and associated handling described herein, a mobile communications service provider may handle high-throughput media and packet-routing via a cloud application in a system such as Kubernetes. These improvements may apply to various networking and protocol types having similar requirements, such as 4G, 5G, internet of things (IoT), SIP, Diameter, RTP, real-time transport control protocol (RTCP), internet protocol security (IPsec), internet key exchange (IKE), etc.

Figure 2:
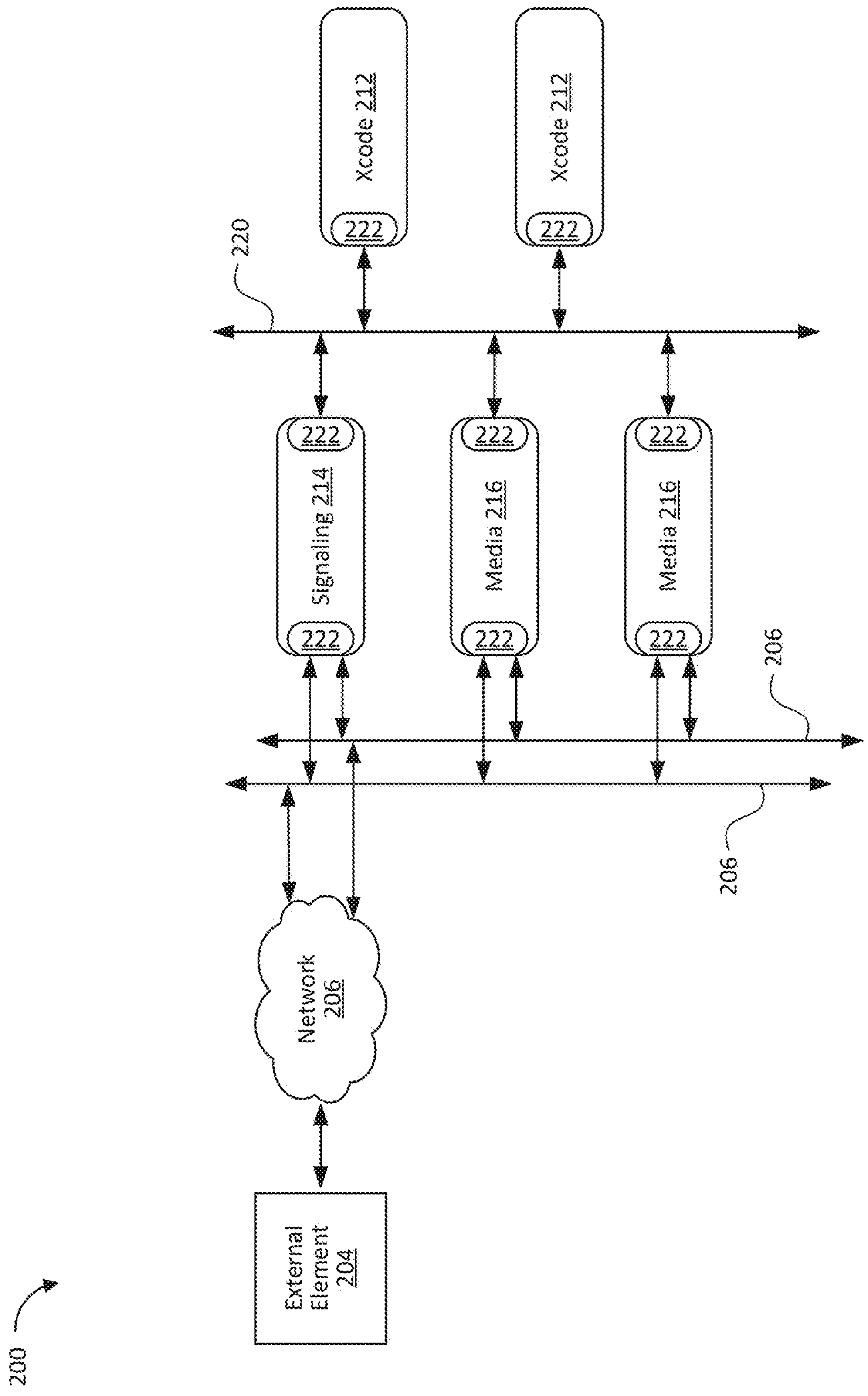
FIG. 2 illustrates an example system configured to implement cloud network management including Vnics, according to an embodiment herein.

Referring now to FIG. 2, an example system 200 configured to implement cloud network service management including Vnics 222 is provided, according to an embodiment herein. In particular, the system 200 may depict an embodiment in which containerized applications or pods have additional interfaces added, enabling direct connection with external networks that is not controlled by a containerized application system such as Kubernetes. The system 200 may include an external element 204 (e.g., a SIP peer), one or more external networks 206, and a plurality of containerized applications or microservices running on pods, such as transcoding module 212, signaling module 214, and media module 216. Further, the additional interfaces may enable modules 212-216 to communicate via an internal network 220, which may be different from the Kubernetes pod network 124 illustrated in FIG. 1.

As illustrated, the additional interfaces may be implemented via Vnics 222. The Vnics may not be directly managed by Kubernetes. Instead, the Vnics 222 enable bypassing of the Kubernetes infrastructure and limitations encompassed by it, such as those described above with respect to FIG. 1. The pods or microservices 212-216 with Vnics 222 can communicate directly with external networks 206 via consistent ingress and egress paths, without going through the Kubernetes load balancer 108. Further, the Vnics 222 can be assigned persistent VIPs that may be known before instantiation of a pod or microservice 212-216 and remain consistent even if the pod or microservice is restarted.

The implementation of the Vnics 222 may be automated and controlled via one or more operators added to a control plane of the Kubernetes environment, or similar control system of other containerized software systems. As noted above, examples of automation and control of the Vnics 222 are described in provided in U.S. application Ser. No. 18/351,810, titled CLOUD BASED NETWORK FUNCTION, U.S. application Ser. No. 18/351,835, titled VIRTUAL IP FOR A CONTAINER POD, and U.S. application Ser. No. 18/351,861, titled CLOUD NETWORK SERVICE MANAGEMENT, U.S. application Ser. No. 18/666,484, titled AUDIT ENGINE(S) FOR MONITORING AND MANAGING VIRTUAL NETWORK INTERFACE CONTROLLERS WITHIN A CLOUD-BASED ENVIRONMENT, each of which is incorporated by reference herein.

As described below, the Vnics 222 may be automated and/or controlled via one or more operators, such as a VnicSet operator, configured to know what application to initiate, how to initiate it, what additional resources the application needs, on and which node the application will be spawned. On that node, the one or more operators may create the required network interface, inject it to the appropriate pod or application and associate a virtual IP, while bypassing the limitations of the Kubernetes system.

Figure 3:
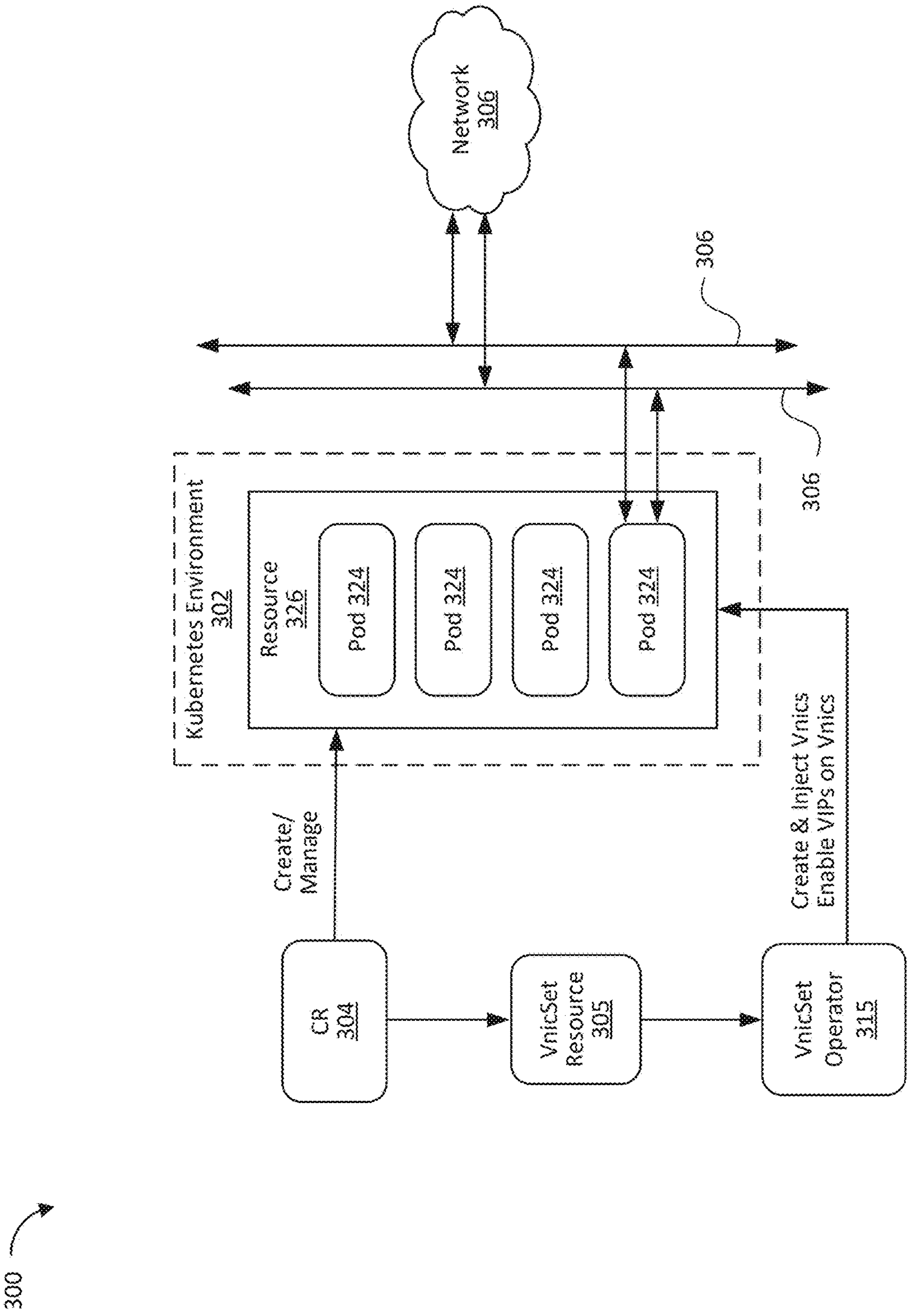
FIG. 3 illustrates an example system including a VnicSet operator, according to an embodiment herein.

Referring now to FIG. 3, an example system 300 including a VnicSet operator 315 for automating and controlling Vnics is illustrated, according to an embodiment herein. As shown, the system 300 includes a Kubernetes environment 302 containing resource 326. The resource 326 may manage the deployment and scaling of stateful or stateless applications. For example, the resource 326 may be a StatefulSet (for stateful applications) or may be Deployment (for stateless applications). The resource 326 may include pods 324 that are in communication with one or more external networks 306. As noted above, the external networks 306 may not be managed by Kubernetes through consistent ingress and egress paths. As such, interfaces may be created and injected to allow the pods 324 to be reachable via external networks 306 using predictable and fixed VIPs provided by Vnics 222.

Within Kubernetes, an operator may be a method of packaging, deploying, and managing an application within the Kubernetes environment 302. In an example, an operator may be an application-specific controller that extends the functionality of the Kubernetes API to create and manage applications for a user, thus may include application-specific information to automate the entire lifecycle of the software it manages. Operators may be customer Kubernetes controllers that use custom resources (CR), providing settings for values defined within a customer resource definition (CRD) file (which may refer to any form of resource definition data and not strictly to file system files), to manage applications and their components. The CRs may provide high-level configuration settings, which an operator may translate into low-level actions based on logic embedded within the operator. As such, an operator may watch a particular CR type and take application-specific actions to bring a current state of managed applications into alignment with a desired state specified in the resource. A custom operator may be invoked or initiated by an administrator or user providing a definition file for the operator and executing it at the Kubernetes control plane (E.g., via an apply command), causing the control plan to create and run the operator.

As shown, the system 300 includes a custom operator: a VnicSet operator 315. The VnicSet operator 315 may manage events associated with VnicSet resource 305. The VnicSet resource 305 objects may be a mechanism by which the VnicSet operator 315 assigns or injects the Vnics onto the pods 324 and enables VIPs on the Vnics for interfacing with the external network 306. The resource files for the pods 324 may include references to the corresponding VnicSet resources 305. The VnicSet resources 305 may be defined by the CR 304. For example, the CR 304 may define what Vnic resource requirements the created applications and associated pods 324 have. Based on the Vnic resource requirements, the VnicSet resource 305 yaml definition file may be created, indicating the required Vnic resources for the resource 326 and the pods 324.

Figure 4:
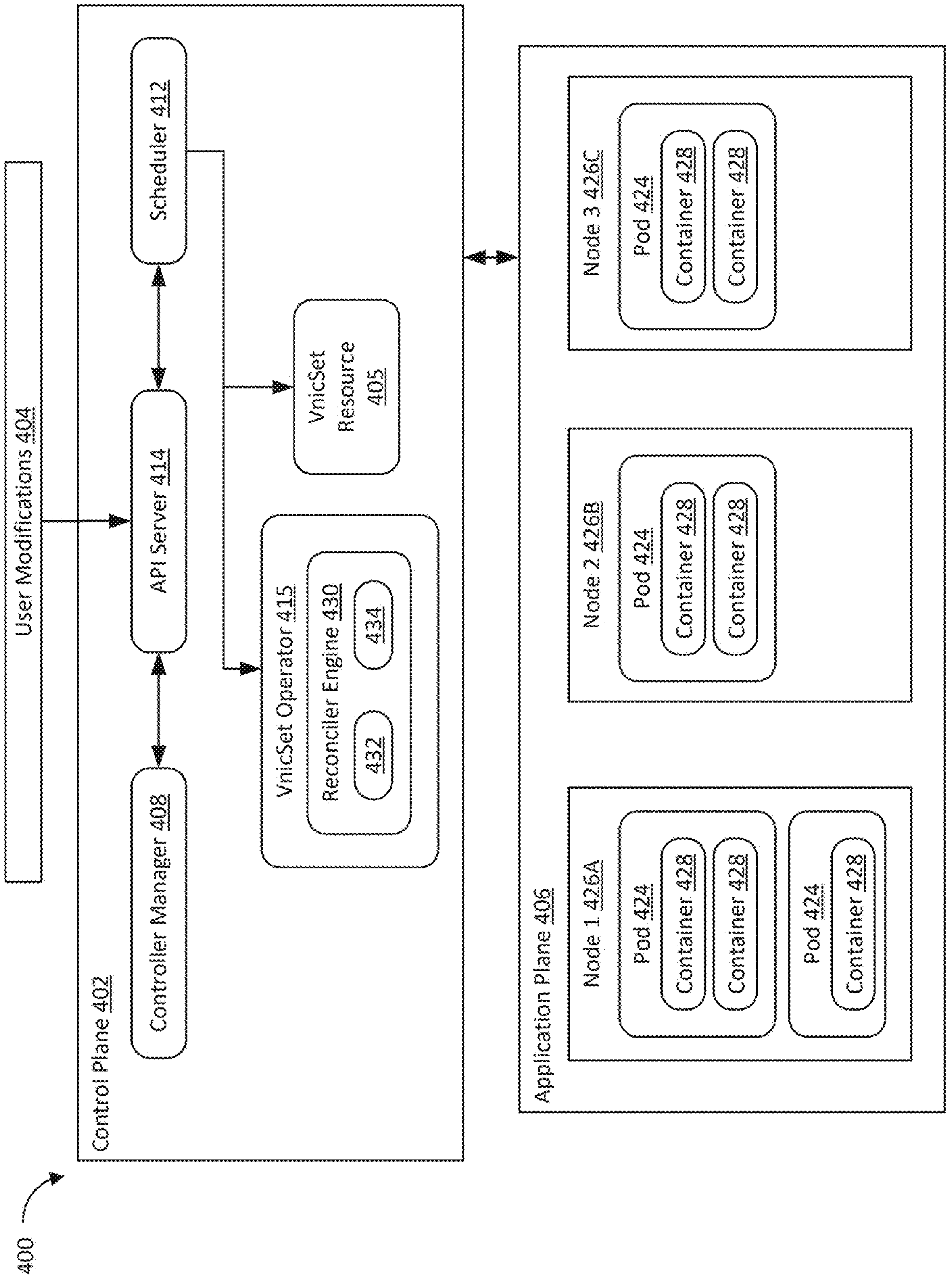
FIG. 4 illustrates an example system configured to implement cloud network service management, according to an embodiment herein.

Referring now to FIG. 4, FIG. 4 provides an example system 400 configured to implement cloud network service management, in accordance with certain embodiments of the present disclosure. In particular, the system 400 may depict an example Kubernetes architecture employing custom operators for monitoring and managing Vnics. The system 400 may include a control plane 402, which may receive user modifications 404 and implement those modifications and create and manage applications in an application plane 406. The control plane 402 may include a controller manager 408, an API server 414, a schedule 412, a VnicSet operator 415, and a VnicSet resource 405. The application plane 406 may include a plurality of worker nodes or hosts, including a first worker node 1 426, a second worker node 2 426, and a third worker node 3 426. Each of the nodes 426 A-C may include one or more pods 424, each of which may include one or more containers 428. Although depicted as part of control plane 402, elements such as VnicSet operator 415 may be executed on worker nodes 426A-C, and may be configured to hook into the control plane 402 to extend the functioning of the control plane. System 400 may correspond to systems described in FIGS. 2-3.

As those skilled in the art readily appreciate, when Kubernetes is deployed, a cluster is provided that includes one or more worker or virtual machines called nodes 426A-C. Each node 426A-C can host one or more pods 424, which may be the smallest deployable unit of computing that can be managed in Kubernetes. Each pod 424 can run one or more containers 428, which may be a bundle of software and all its dependencies (e.g., an application or microservice). Through nodes 426A-C and respective pods 424, Kubernetes can manage the resources needed to execute, expand, and manage applications or services in a cloud environment. These applications and resources may be managed via components running in the control plane 402.

The nodes 426A-C may be provisioned from a cloud provider external to Kubernetes, such as OpenStack. To orchestrate the deployment and management of the nodes 426A-C, the control plane 402 may be a container orchestration layer that exposes the API and interfaces to external networks. In part, the control plane 402 may define, deploy, and manage the lifecycle of containers 428, as well as the nodes 426A-C and pods 424 on which the containers 428 run. To manage the lifecycle of the containers 428, the control plane 402 may include various components, such as an API server 414, a controller manager 408, and a scheduler 412, each of which is described in turn below.

The API server 414 may provide a front end for the control plane 402, through which all other components may interact. The API server 414 may expose the Kubernetes API and receive user modifications 404 and other input. User modifications 404 may be received in the form of kubectl command line interface (CLI) instructions, which may include defining objects through yaml or json files. The API server 414 may validate and configure data for the API objects, including pods 424.

The controller manager 408 may run controller processes, where a controller may be a control loop that watches a shared state of the cluster through the API server 414 and makes changes to move the current state towards a desired state (which may be specified through user modifications 404, for example). The controller manager 408 may run controller processes for default Kubernetes controllers, as well as for controllers implemented by custom operators (e.g., VnicSet operator 415). Accordingly, the controller manager 408 may implement the management functions controlled by custom operators such as the VnicSet operator 415.

The scheduler 412 may watch for newly created pods 424 or other resources with no assigned node 426A-C and may select a node for the resources to run on. Decisions for which node 426A-C to assign a newly created pod 424 may be based on resource requirements and availability (e.g., based on workload distribution for the nodes), data locality, and other factors. Operators responsible for the creation of pods 424 may also influence or control which node 426A-C a pod is assigned to.

As described with respect to FIG. 3, a Kubernetes operator may be a method of packaging, deploying and managing an application in Kubernetes. An operator may implement a custom controller to manage applications according to values defined in custom resources (CR) (e.g., VnicSet resource 405). In some embodiments, operators (e.g., VnicSet operator 415) may run in the worker nodes 426A-C. Because operators may implement controllers in the worker nodes 426A-C, but controllers may run in the control plane 402, operators may effectively extend the control plane 402 into the worker nodes 426A-C. An operator may add itself to the controller manager 408 list, thereby extending the list to the application plane 406, and may start monitoring the operator's resources via the API server 414.

An application pod 424 may be created as part of a resource, such as the resource 326. The scheduler 412 may decide which node 426A-C to assign the pod 424 based on resource availability. The controller manager 408 may be listening to the API server 414 for resources it is subscribed for. If the resource is modified, the change notification may trigger an event with the controller manager 408 which invokes the corresponding controller method for that resource to bring the resource back to the desired state from the current state.

When a custom operator (e.g., VnicSet operator 415) adds a hook to the controller manager 408, the controller manager will monitor the API server 414 for changes to a custom resource (e.g., VnicSet resource 405) associated with the custom operator, such as create, modify, or delete notifications. Any notification may indicate that a state of the custom resource has changed (e.g., changes to either the desired state or current state may result in a determination that the current state and desired state do not match), and triggers to the API server 414. Based on the notification, the controller manager 408 can execute a controller action onto the custom resource to bring the current state and the desired state of the application pod back into equilibrium. Essentially, an operator may add an endpoint to the Kubernetes API called a custom resource (CR), along with a control plane 402 component or hook that monitors and maintains resources of the new type.

As illustrated, a custom operator, such as the VnicSet operator 415 may include a reconciler engine 430. As will be described in greater detail below with respect to FIGS. 5-10, the reconciler engine 430 may include a main reconciler module 432 and a clean-up module 434, which may direct the controller manager 408 on how to bring a custom resource from a current state to a desired state (e.g., perform a reconciliation action). That is, the reconciler engine 430 may coordinate and manage reconciliation actions taken by the controller manager 408 responsive to user modifications 404 with a respective cloud provider. For example, an operator may include the reconciler engine 430 as part of the controller method, which may continually loop to determine a state of an associated custom resource (e.g., the VnicSet operator 415, by way of the reconciler engine 430 and controller manager 408, may continually monitor the state of the VnicSet resource 405 through API server 414). Whenever a change event happens for the custom resource (e.g., based on user modifications 404), the operator may receive a notification. The operator may then adjust the state of the custom resource to bring it from the current state to the desired state. This is referred to herein as a reconciliation action. In case of any error or other failure to bring the custom resource to the desired state, the operator and reconciler engine 430 may continue in a loop to execute a particular set of operations until the custom resource reaches the desired state.

As described above, the pods 424 may contain one or more Vnics, such as the Vnics 222, which provide an interface through which an external source can interact and communicate with the pods 424. As such, the VnicSet operator 415 may create a Vnic for a respective pod 424 (or microservice) upon the pods 424 creation. When the Vnic is created for a respective pod 424, the Vnic operator 415 may attach the Vnic to a respective node 426A-C and inject the Vnic into the pod 424.

Once a Vnic is created for injection, a VIP may be enabled and associated with the Vnic and pod according to the VnicSet resource CRD definition file. In some examples, all pods associated with a target application may have a Vnic with the same VIP. This VIP may be enabled only on active pods. Multiple Vnics with VIPs could be injected to provide multiple interface support for, e.g., network segregation. The same VIP can be associated with both active and standby pods to make the same interface available during pod switchover or failover events.

Currently, when reconciliation actions are taken on behalf of Vnics, such as attach actions or detach actions, the VnicSet operator 415 generates and sends reconciliation actions to a respective cloud provider on a per cluster basis. As such, reconciliation actions for all worker nodes 426A-C within that cluster may be simultaneously transmitted to the cloud provider. However, because the cloud provider processes these requests serially, this batch approach of handling reconciliation actions often causes external resource database corruption, resource leaks, or failures. Additionally, because the reconciliation actions are treated equally regardless of the underlying action, current approaches can result in delayed application loading, starts, and scaling activities.

As those skilled in the art readily appreciate, leaked external resources, like Vnics, can lead to several negative consequences. For example, non-active (e.g., leaked) Vnics not only results in wasted resources but also creates potential networking conflicts and inefficiencies. One such situation involves a Vnic being assigned to a port by the cloud provider (e.g., attached to the node 426A) but failing to be used (e.g., not injected). With multiple instances of the Vnics assigned to the same pod, conflicts may occur, leading to communication errors and instability within the Kubernetes cluster. Additionally, redundant Vnics can introduce unnecessary complexity, making it challenging to troubleshoot and maintain the cluster's networking configuration. Furthermore, excessive allocation of ports without actual utilization can lead to port exhaustion, limiting the scalability and performance of the Kubernetes environment and/or cloud provider. Overall, the presence of non-active Vnics poses a significant risk to the reliability, efficiency, and scalability of Kubernetes deployments.

Additionally, the conventional approach of handling reconciliation actions on a per cluster bases also fails to differentiate between the different types of actions. The lack of differentiation between reconciliation actions may result in a variety of negative consequences. For example, failing to prioritize attach actions within OpenStack can lead to several negative consequences, severely impacting application performance and reliability. Without prioritization, critical resources such as storage volumes and network interfaces may experience significant delays in becoming available, resulting in prolonged application start-up times and inefficient scaling. This can cause applications to under-perform, leading to user dissatisfaction and potential revenue loss. Additionally, the lack of timely resource allocation can create bottlenecks, disrupting the balance and responsiveness of workloads, and increasing the likelihood of resource contention and failures. These issues not only degrade the user experience but also increase operational complexity and maintenance costs, ultimately compromising the effectiveness and robustness of the cloud infrastructure.

Figure 5:
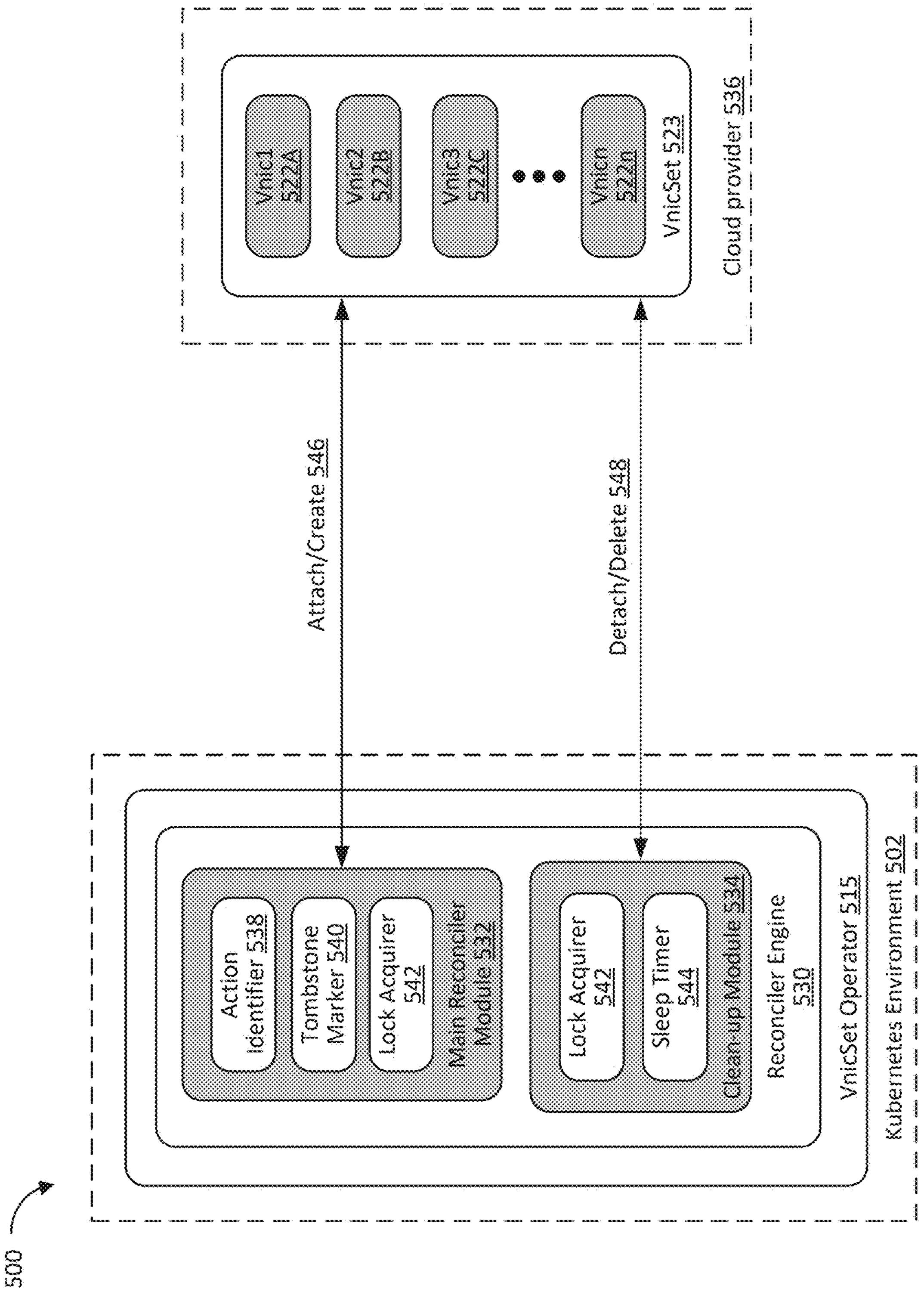
FIG. 5 illustrates an operational environment including a VnicSet operator containing a reconciler engine, according to an embodiment herein.

To manage and coordinate reconciliation actions, the VnicSet operator 415 may include the reconciler engine 430. Referring now to FIG. 5, an operational environment 500 including a VnicSet operator 515 containing a reconciler engine 530 is provided, according to an embodiment herein. As illustrated, the reconciler engine 530 may be part of the VnicSet operator 515, which may be the same or similar to the VnicSet operator 415. That is, the reconciler engine 530, like the reconciler engine 430 may be part of the control plane 402 of the Kubernetes environment 302 once the VnicSet operator 515 is deployed into the Kubernetes environment 502.

Figure 6:
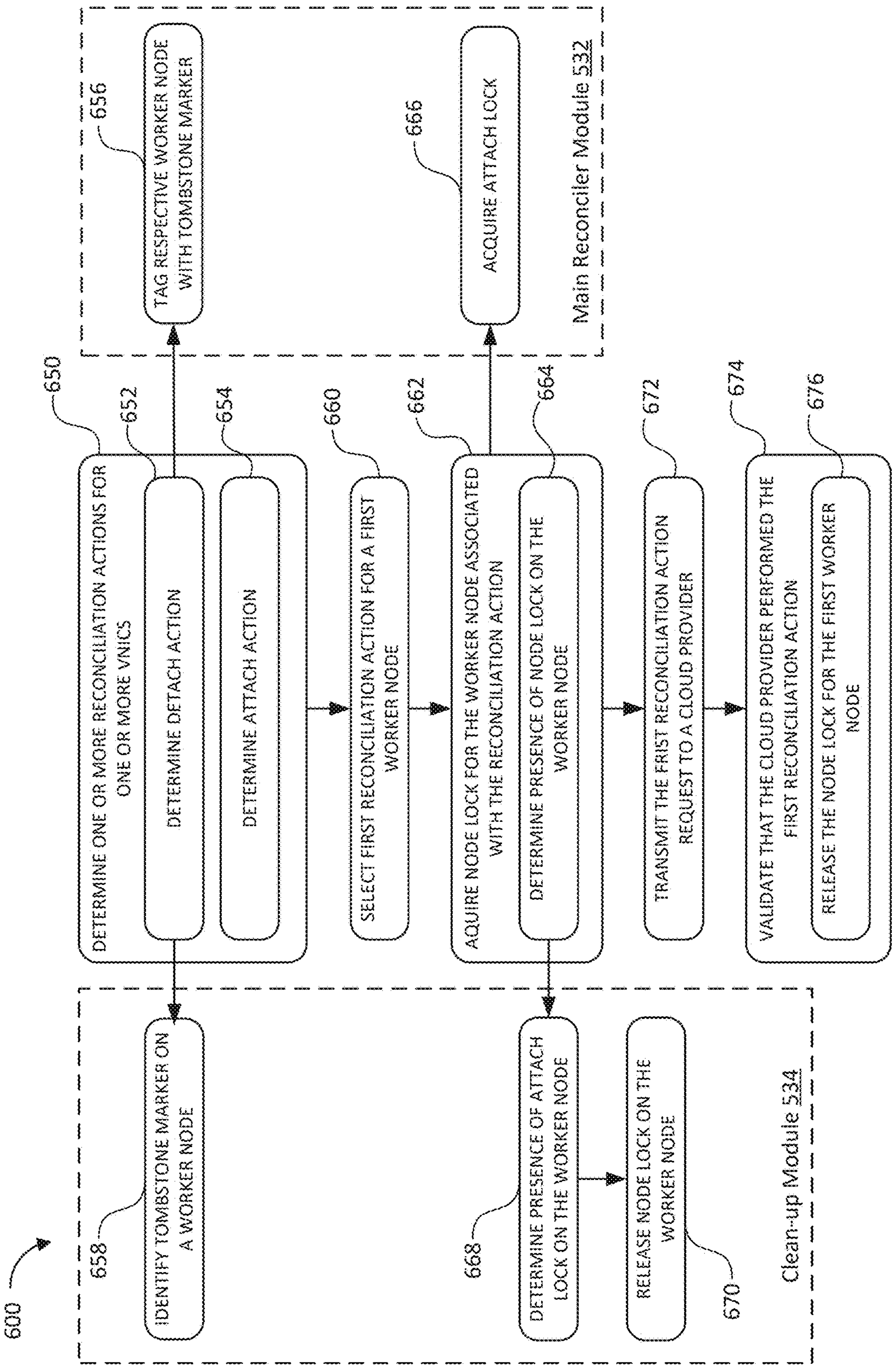
FIG. 6 illustrates an example operational flow for providing a reconciler engine and one or more of its functions, according to an embodiment herein.

For ease of illustration, FIG. 5 is described with reference to FIG. 6 which provides an operational flow 600 for providing a reconciler engine and one or more of its functions, according to an embodiment herein. In other words, FIG. 6 illustrates the flow 600, which is also referred to herein as a reconciler engine process 600, for dynamically managing external resources within a cloud-based environment, according to an embodiment herein. While FIG. 6 is described with relation to FIG. 5, it should be appreciated that components, elements, and steps from any other Figures described herein may be equally applicable.

As described above, a cloud provider 536, such as OpenStack, may provision resources (e.g., VMs) on which application pods or microservices are served within the Kubernetes environment 502. As such, the VnicSet operator 515 may interact with the cloud provider 536 for resource management based on various events, which may include create, update, or deletion events. Responsive to a respective event, the reconciler engine 530 may determine whether a reconciliation action is required. A reconciliation action may include an attach action, such as the attach/create action 546 and/or may include a detach action, such as the detach/delete action 548. For example, the VnicSet operator 515 may receive a user modification 404 which deletes or creates a portion of an application program corresponding to a respective Vnic 522. Based on this delete or create event, the VnicSet operator 515, in particular the reconciler engine 530 may determine one or more reconciliation actions for the respective Vnic 522 (650).

Since the Vnic 522 may be deployed for each respective application pod or microservice as it is provisioned by the cloud provider 536, there may be multiple Vnics 522A-n executing via the cloud provider 536. In the illustrated example, there is a VnicSet 523 containing Vnics 522A-n executing on VMs provisioned by the cloud provider 536. The VnicSet 523 may correspond to the VnicSet resource 405 that is managed by the VnicSet operator 515, as described above. Accordingly, as the changes are made with respect to the VnicSet resource 405, the VnicSet 523 may also undergo changes, such as requiring additional Vnics 522A-n or removal of Vnics 522A-n, depending on the effect of the changes to the application pods executing in the Kubernetes environment 502.

As illustrated, the reconciler engine 530 may include a main reconciler module 532 and a clean-up module 534. The main reconciler module 532 may manage reconciliation actions, such as determining whether a reconciliation action for respective Vnic 522A-n is a detach action (652) or an attach action (654). In particular, the main reconciler module 532 may include an action identifier 538 that determines whether a reconciliation action is an attach action or a detach action. If the reconciliation action is a detach action, then the main reconciler module 532 may tag a respective worker node with a tombstone marker 540. For example, if the detach action corresponds to a delete event of a pod on which the Vnic 522A is injected, then the main reconciler module 532 may tag the worker node associated with the Vnic 522A with a tombstone marker 540. As those skilled in the art readily appreciate, a tombstone marker 540 is a placeholder used to indicate that a particular software element has been or is slated to be logically deleted. As will be described in greater detail below, by using tombstone markers 540, the reconciler engine 530 can track which worker nodes are slated to be deleted without immediately transmitting the detach/delete request to the cloud provider 536.

In contrast, if the action identifier 538 determines that the reconciliation action includes an attach action, the main reconciler module 532 may continue to select a first reconciliation action for a respective worker node for performing the reconciliation process (660). As noted above, the reconciler engine 530 may perform a reconciliation process on a per node basis instead of on a per cluster basis. As such, when an event, such as deletion or creation of multiple instances of an application, is detected and the respective reconciliation actions determined which involve the deletion or creation of multiple worker nodes corresponding to the respective instances, the reconciler engine 530 may perform each of the following functions on a per node basis. This process is also further exemplified and described with respect to FIGS. 7 and 8. The clean-up module 534 may also perform the reconciliation process on a per node basis. When the clean-up module 534 determines that the reconciliation actions include a detach action, the clean-up module 534 may select a first detach action for a respective worker node to initiate the reconciliation process (660).

To determine that the reconciliation actions include a detach action, the clean-up module 534 may identify tombstone markers 540 on worker nodes associated with the detach actions (658). In some embodiments, the clean-up module 534 may include a sleep timer 544 such that the clean-up module 534 may be in a sleep state for a predefined time duration and periodically wake-up when the sleep timer 544 indicates it's time to transition from the sleep state to a wake state. By including the sleep timer 544, the reconciler engine 530 can efficiently manage and use resources within the Kubernetes environment 502. That is, by allowing the clean-up module 534 to enter a low-power state or pause operations when not actively in use, the sleep timer 544 helps conserve CPU cycles and memory, reducing overall resource consumption.

When the clean-up module 534 wakes up and enters a wake state, the clean-up module 534 may check for tombstone markers 540. As those skilled in the art readily appreciate, the clean-up module 534 may check the respective resource (e.g., the worker node) for a "label" that includes the tombstone marker. As noted above, the main reconciler module 532 may mark respective worker nodes with tombstone markers 540 as respective delete events are identified by the VnicSet operator 515. As such, when the clean-up module 534 wakes up, there may be any number of worker nodes that are marked with tombstone markers 540 based on corresponding delete events. If upon waking up, the clean-up module 534 determines that no worker nodes have been marked with a tombstone marker 540, the clean-up module 534 may return to a sleep state until the next wake time. The sleep timer 544 may set a sleep time duration of a few seconds to a few minutes, to up to a few hours. As will be discussed below, once the clean-up module 534 addresses each tombstone marker and respective detach action, including validating that the detach action is performed, the clean-up module 534 may transition into the sleep state.

Once a first reconciliation action is selected for a respective worker node, the reconciler engine 530 may acquire a node lock for the respective worker node associated with the action (662). For example, if the reconciliation action is the Vnic 522A which is injected on a pod running on the worker node 426A, then the reconciler engine 530 may acquire a node lock for the worker node 426A. In particular, each of the main reconciler module 532 and the clean-up module 534 may include a lock acquirer 542. In some embodiments, each of these modules 532/534 may operate independently, and as such, each lock acquirer 542 may determine the presence of a node lock on a respective worker node as an initial step for acquiring a node lock (664).

As used herein, a node lock is a mechanism used to manage and coordinate the activities of worker nodes within a cluster. Worker nodes are the machines that run the applications and workloads assigned by the control plane. The node lock ensures that specific tasks or resources are only accessed by one node at a time, preventing conflicts and ensuring data consistency. Specifically, the node lock used herein may prevent the other module from accessing the respective worker node and performing any actions thereon. For example, if the main reconciler module 532 acquires the node lock for the worker node 426A, this may prevent the clean-up module 534 from performing any reconciliation actions on the worker node 426A. In contrast, if the clean-up module 534 acquires the node lock for the worker node 426A, this may prevent the main reconciler module 532 from performing any reconciliation actions on the worker node 426A. In some cases, the node lock may also prevent other mechanisms or functions within the Kubernetes environment 502 from performing any actions on the respective worker node.

In some embodiments, prior to acquiring the node lock on a respective worker node, the main reconciler module 532 may acquire an attach lock (666) for the worker node. For example, if the reconciliation action includes an attach action for attaching the Vnic 522A to the worker node 426A, then the main reconciler module 532 may initially acquire an attach lock, and then acquire the node lock for the worker node 426A once it is available. As will be described in greater detail below with respect to FIGS. 9 and 10, the attach lock allows the reconciler engine 530 to prioritize attach actions. For example, if the clean-up module 534 is performing a series of detach actions, after each detach action is performed, and in some cases, validated, the clean-up module 534 may check to see if there is an attach lock on the respective worker node. If the clean-up module 534 determines the presence of an attach lock on the respective worker node (668), the clean-up module 534 may release the node lock on the worker node (670). Once the node lock is released, the main reconciler module 532 may acquire the node lock and proceed with the attach action.

Once a respective module within the reconciler engine 530 acquires the node lock, the module may generate and transmit a respective reconciliation action request to the cloud provider 536 (672). For example, for an attach action on the worker node 426A, once the main reconciler module 532 acquires the node lock and the attach lock for the worker node 426A, the main reconciler module 532 may transmit an attach request 546 to the cloud provider 536. The attach request 546 may request specific resources or services from the cloud provider 536. Responsive to receiving the attach request 546, the cloud provider 536 may provision respective virtual machines, storage volumes, or networking resources, to support the attach action.

Similarly, for detach action on the worker node 426A, once the clean-up module 534 acquires the node lock and confirms that there is no attach lock for the worker node 426A, the clean-up module 534 may transmit a detach request 548 to the cloud provider 536. The detach request 548 may indicate or otherwise request that the cloud provider 536 release the resources of services previously provisioned for the worker node 426A. Responsive to receiving the detach request 548, the cloud provider 536 may release the previously provisioned respective virtual machines, storage volumes, or networking resources, based on the detach action. In some cases, the cloud provider 536 may also update an external resource database to reflect the new allocation of resources based on the attach actions and the detached actions.

In some embodiments, the reconciler engine 530 may validate that the cloud provider 536 performed the requested reconciliation action (674). As those skilled in the art readily appreciate, the cloud provider 536 may not provide a notification once a requested action is completed. As such, the reconciler engine 530 may periodically check with the cloud provider 536 to determine whether the requested action has been performed. For example, after the attach action 546 is transmitted to the cloud provider 536, the main reconciler module 532 may check with the cloud provider 536 periodically to validate that the attach action 546 is completed. Similarly, after the detach action 548 is transmitted to the cloud provider 536, the clean-up module 534 may check with the cloud provider 536 periodically to validate that the detach action 548 is completed.

Once the reconciler engine 530 determines that a respective reconciliation action has been performed by the cloud provider 536, the reconciler engine 530 may release the node lock on the respective worker node (676). As will be described in greater detail in the following discussion, in some cases, upon validation, a respective module (e.g., the main reconciler module 532 or the clean-up module 534) may determine a next reconciliation action for the same worker node. In such cases, the module may retain the node lock and continue on to generate and send the next request for the reconciliation action to the cloud provider 536. For example, upon validation of a first detach action for the worker node 426A, the clean-up module 534 may determine a second detach action for the worker node 426A. After checking that there is no attach lock on the worker node 426A, the clean-up module 534 may generate and transmit the detach request 548 for the second detach action to the cloud provider 536. Once the clean-up module 534 determines that all the detach actions for the worker node 426A are validated, the clean-up module 534 may release the node lock for the worker node 426A.

Similarly, upon validation of a first attach action for the worker node 426A, the main reconciler module 532 may determine a second attach action for the worker node 426A. In such cases, the main reconciler module 532 may retain the node lock and the attach lock on the worker node 426A and transmit the attach request 546 for the second attach action. Once the main reconciler module 532 determines that all attach actions for the worker node 426A are validated, the main reconciler module 532 may release the node lock and the attach lock for the worker node 426A.

Figure 7:
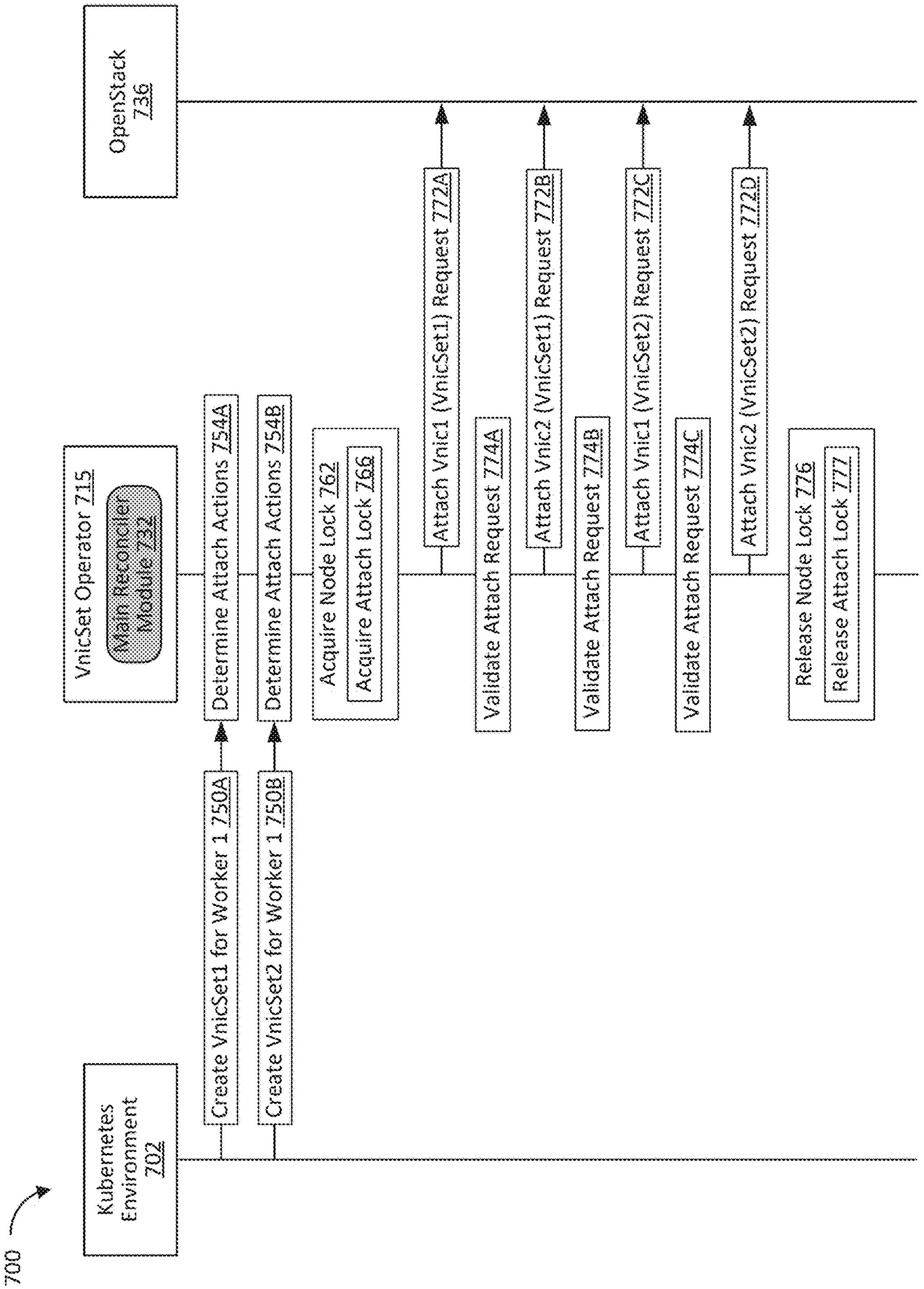
FIG. 7 illustrates an example operational flow illustrating one or more functions of a VnicSet operator, according to an embodiment herein.

Referring now to FIG. 7, an example operational flow 700 illustrating one or more functions of a VnicSet operator 715 is provided, according to an embodiment herein. In particular, the illustrated flow 700 may exemplify how a reconciler engine including a main reconciler module 732 manages multiple attach actions for a single worker node. The main reconciler module 732 may be the same or similar to the main reconciler module 532 and be part of a reconciler engine (not shown), such as the reconciler engine 530. As described above, the reconciler engine including the main reconciler module 732 may be part of a VnicSet operator 715, which may be the same or similar to the VnicSet operator 515.

As shown, at a first time the VnicSet operator 715 may receive or determine a first create event (750A) and at a second time the VnicSet operator 715 may receive or determine a second create event (750B) from a Kubernetes Environment 702. The first event may be to create a first VnicSet1 on a first worker node, such as the worker node 426A, and the second event may be to create a second VnicSet2 on the first worker node. These create events may be based on application loading, scaling, or restarting activities. As described above, each of the VnicSets 1 and 2 may include multiple Vnics. For ease of illustration, each VnicSet is described as including a first Vnic1 and a second Vnic2, however, in practice any number of Vnics may be included in a VnicSet, limited only by hardware and resource capacity.

Responsive to identifying the first create event (750A), the VnicSet operator 715 may determine one or more respective reconciliation actions. In particular, the main reconciler module 732 of the VnicSet operator 715 may determine that the first create event includes two attach actions (754A). Similarly, responsive to the second create event (750B), the main reconciler module 732 may determine that the second create event includes two attach actions (754B). Since the first event was received first, the main reconciler module 732 may perform the respective attach actions (754A) for the first VnicSet1 prior to performing the respective attach actions (754B) for the second VnicSet2.

Once the attach actions are identified, the main reconciler module 732 may acquire a node lock (762) for the first worker node, here worker node 426A. In some cases, before acquiring the node lock (762), the main reconciler module 732 may first acquire an attach lock (766) for the worker node 426A. As described above, by acquiring the attach lock first, the main reconciler module 732 can prioritize the attach actions over any on-going detach actions. As such, if a clean-up module is performing detach actions on the worker node 426A, and thus has custody of the node lock on the worker node 426A, the attach lock may instigate the clean-up module to release the node lock so that the main reconciler module 732 can acquire it. Once the main reconciler module 732 acquires the node lock, the main reconciler module 732 may proceed with generating and sending attach action requests for the attach actions.

As described above, the reconciler engine provided herein performs reconciliation processes or actions on a per node basis, instead of the per cluster basis as conventionally done. Additionally, instead of transmitting all of the reconciliation action requests to the cloud provider, here OpenStack 736, the main reconciler module 732 may transmit each request individually, waiting to confirm that the request was furnished or completed (e.g., validated) before sending the next request. By transmitting each request only upon validation of a previous request, the reconciler engine can prevent external resource or Vnic leakage.

As shown, once the node lock and the attach lock are acquired for the first worker node, the main reconciler module 732 may transmit a first attach request (772A) for the first Vnic1 in the first VnicSet1. The first attach request is sent to OpenStack 736 which may, in turn, service the request and attach the first Vnic1 to the first worker node. Since OpenStack 736 does not notify the VnicSet operator 715 when a request is serviced, the reconciler engine, and in some cases, the main reconciler module 732 may periodically check with OpenStack 736 to validate that the attach request (774A) is completed.

Since each of the attach actions received from the Kubernetes environment 702 are for the first worker node, after validation of the first attach request, the main reconciler module 732 may continue on to a second attach request for the next Vnic in the first VnicSet1, here Vnic2. As such, the main reconciler module 732 may generate and transmit the second request (772B) to attach the second Vnic2 of the first VnicSet1 to OpenStack 736. Again, the main reconciler module 732 may validate the second attach request (774B) before continuing onto the next request.

In the illustrated example, there are two Vnics per VnicSet. As such, once the second request to attach the second Vnic2 in the first VnicSet1 is validated, the main reconciler module 732 may generate and send requests to attach the Vnics in the second VnicSet2. Since the second VnicSet2 is also on the first worker node, the main reconciler module 732 maintains its node lock and attach lock on the first worker. As such, the main reconciler module 732 may transmit a third request (772C) to attach a first Vnic1 of the second VnicSet2, and upon validation of the third request (774C), send a fourth request (772D) to attach a second Vnci2 of the second VnicSet2 onto the first worker node.

After sending the fourth request, the main reconciler module 732 may release the node lock (776) and release the attach lock (777). Because the main reconciler module 732 completed each of the attach actions, the main reconciler module 732 does not need to validate that the fourth request is completed by OpenStack 736 before releasing the locks. Instead, once the main reconciler module 732 addresses each of the attach actions for the first worker node, the main reconciler module 732 releases the locks so that other actions can be performed on the first worker node, such as the clean-up module addressing any outstanding detach actions.

Figure 8:
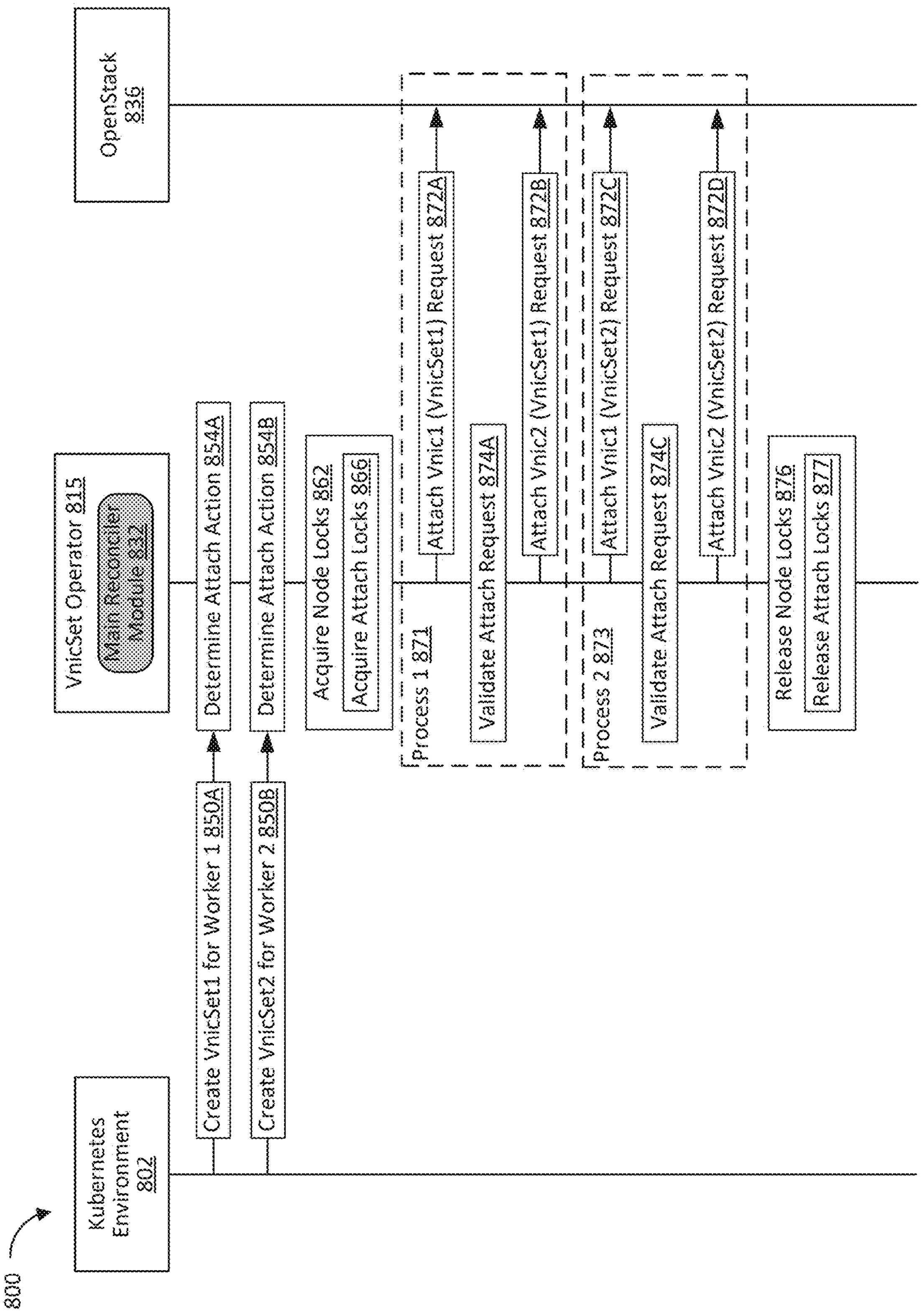
FIG. 8 illustrates another example operational flow illustrating one or more functions of a VnicSet operator, according to an embodiment herein.

Referring now to FIG. 8, another example operational flow 800 illustrating one or more functions of a VnicSet operator 815 is provided, according to an embodiment herein. In particular, the illustrated flow 800 may exemplify a reconciler engine including a main reconciler module 832 handling multiple attach actions for multiple worker nodes. The main reconciler module 832 may be the same or similar to the main reconciler module 532 and be part of a reconciler engine (not shown), such as the reconciler engine 530. As described above, the reconciler engine including the main reconciler module 832 may be part of a VnicSet operator 815, which may be the same or similar to the VnicSet operator 515.

As shown, at a first time the VnicSet operator 815 may receive or determine a first create event (850A) and at a second time the VnicSet operator 815 may receive or determine a second create event (850B) from a Kubernetes Environment 802. The first event may be to create a first VnicSet1 on a first worker node, such as the worker node 426A, and the second event may be to create a second VnicSet2 on a second worker node, such as the worker node 426B. These create events may be responsive to application loading, scaling, or restarting activities. As described above, each of the VnicSets 1 and 2 may include multiple Vnics. For case of illustration, each VnicSet is described as including a first Vnic1 and a second Vnic2, however, in practice any number of Vnics may be included in a VnicSet, limited only by hardware and resource capacity.

Responsive to identifying the first create event (850A), the VnicSet operator 715 may determine one or more respective reconciliation actions. In particular, the main reconciler module 832 of the VnicSet operator 815 may determine that the first create event includes two attach actions (854A). Similarly, responsive to the second create event (850B), the main reconciler module 832 may determine that the second create event includes two attach actions (854B).

As described above, once the attach actions are identified, the main reconciler module 832 may acquire a node lock (862) for a respective worker node and an attach lock (866) for the respective worker node. Because the attach actions are for two separate worker nodes (e.g., 426A and 426B), the main reconciler module 832 may acquire an attach lock for the first worker node and an attach lock for the second worker node. Similarly, the main reconciler module 832 may acquire a node lock for each worker node. Once the main reconciler module 832 acquires the node lock, the main reconciler module 832 may proceed with generating and sending attach action requests for the attach actions.

As described above, the reconciler engine provided herein performs reconciliation processes or actions on a per node basis, instead of the per cluster basis as conventionally done. Since OpenStack 836 service requests involving different worker nodes simultaneously due to its distributed architecture, OpenStack 836 can process requests and allocate resources across multiple nodes in parallel. However, for requests involving the same worker node, such as illustrated in the flow 700, OpenStack 836 services these requests serially because a single node can only process one task at a time to ensure data consistency and avoid conflicts. By sequential handling requests for a single worker node, OpenStack 836 prevents race conditions and ensures that operations are completed accurately without interference from simultaneous requests.

Since the attach actions involve two separate worker nodes, the main reconciler module 832 may send attach requests for the attach actions of each worker node simultaneously or in parallel to OpenStack 836. As illustrated, a first reconciliation process 871 may be performed by the main reconciler module 832 for the first attach actions involving attaching the first VnicSet1 to the first worker node. That is, the first process 871 may include a first attach request (872A) for attaching a first Vnic1 in the first VnicSet1 to the first worker node, 426A, and upon validation of the first attach request (874A), a second attach request (872B) for attaching a second Vnic2 in the first VnicSet1 to the first worker node.

The main reconciler module 832 may also perform a second reconciliation process 873 for the second attach actions involving attaching the second VnicSet2 to the second worker node. The second process 873 may include a third attach request (872C) for attaching a first Vnic1 in the second VnicSet2 on the second worker node, 426B, and responsive to validating the third request (874C), a fourth attach request (872D) for attaching the second Vnic2 in the second VnicSet2 on the second worker node. Although the first process 871 and the second process 873 are illustrated sequentially due to illustration limits, the first process 871 and the second process 873 may be performed in an overlapping manner, such as simultaneously. That is, the main reconciler module 832 may generate and transmit a third request (872C) for attaching a first Vnic of the second VnicSet2 to OpenStack 836 responsive to receiving the node and attach locks on the second worker node, instead of waiting until the first process 871 is completed and validated.

Once each of the processes 871 and/or 873 are completed, the main reconciler module 832 may release the node locks (876) on the first worker node and the second worker node, and similarly release the attach locks (877). As described above with respect to FIG. 7, the node and attach locks for a respective worker node may be released upon completion of a final attach request for that node.

Figure 9:
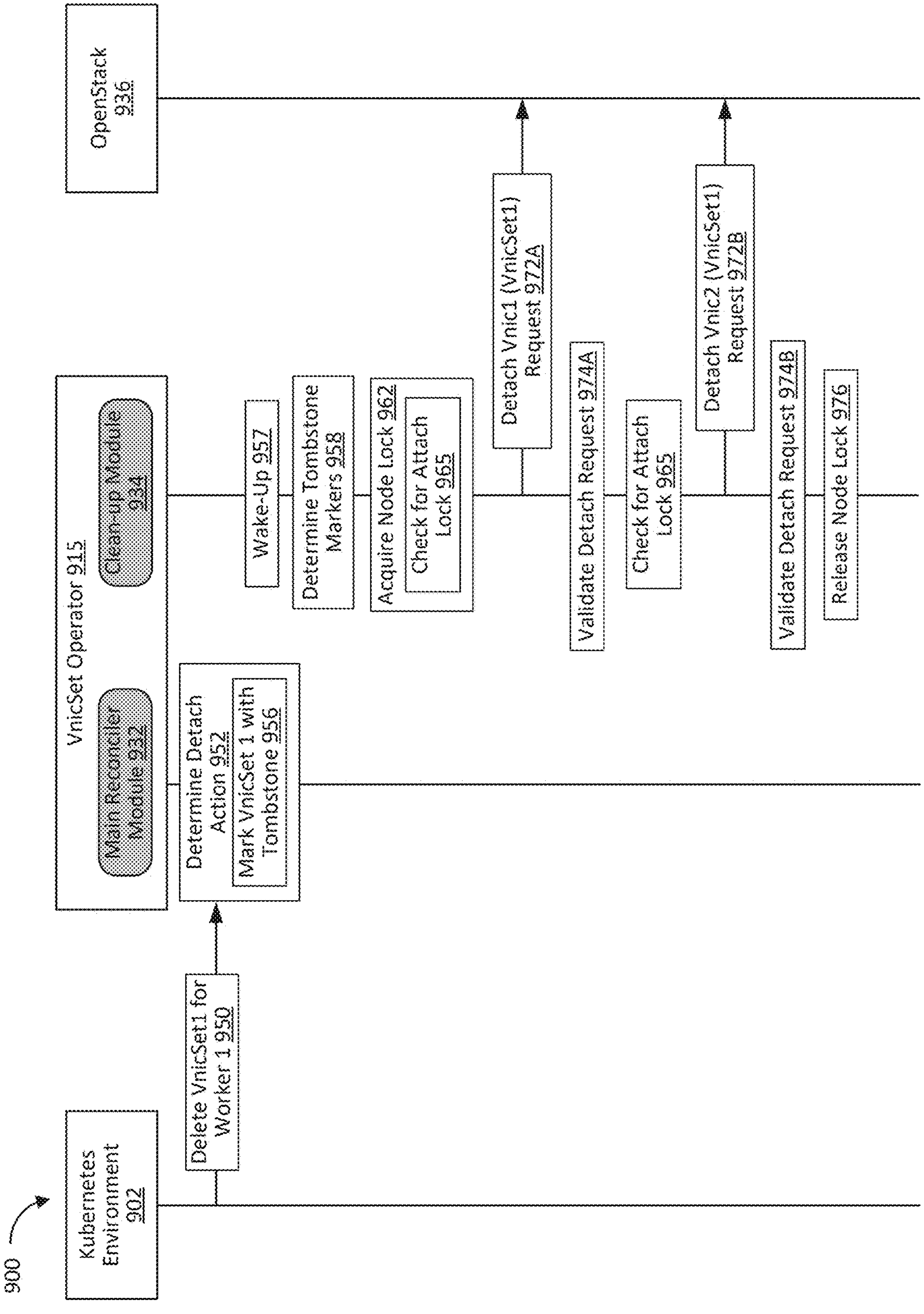
FIG. 9 illustrates another example operational flow illustrating one or more functions of a VnicSet operator, according to an embodiment herein.

Referring now to FIG. 9, an example operational flow 900 illustrating one or more functions of a VnicSet operator 915 is provided, according to an embodiment herein. In particular, the illustrated flow 900 may exemplify a reconciler engine including a main reconciler module 932 and a clean-up module 934 managing multiple detach actions for a single worker node. The main reconciler module 932 may be the same or similar to the main reconciler module 532, the clean-up module 934 may be the same or similar to the clean-up module 534, and both modules 932 and 934 may be part of a reconciler engine (not shown), such as the reconciler engine 530. As described above, the reconciler engine may be part of a VnicSet operator 915, which may be the same or similar to the VnicSet operator 515.

As shown, the VnicSet operator 915 may receive or determine a delete event (950) from a Kubernetes Environment 902. The delete event may be to delete a VnicSet1 from a worker node, such as the worker node 426A. The delete event may be based on application tear-down or restart activities. As described above, the VnicSet1 may include multiple Vnics, but for case of illustration, the VnicSet1 is described as including a first Vnic1 and a second Vnic2, however, in practice any number of Vnics may be included in a VnicSet, limited only by hardware and resource capacity.

Responsive to identifying the delete event, the VnicSet operator 915 may determine one or more respective reconciliation actions. In particular, the main reconciler module 932 may determine a detach action (952) for each of the Vnics within the VnicSet1. Since the main reconciler module 932 does not manage detach actions, the main reconciler module 932 may mark the VnicSet1 with a tombstone marker (956). In some cases, this may involve marking the respective worker node with the tombstone marker, while in other cases, this may involve marking each of the Vnics included in the VnicSet1 with a tombstone marker. If there are no further events or actions, the main reconciler module 932 may take no further actions with respect to the delete event.

At a time after the main reconciler module 932 marks the VnicSet1 with the tombstone marker, the clean-up module 934 may wake-up (957) and determine whether any worker nodes are marked with tombstone markers (958). As described above, the clean-up module 934 may include a sleep timer 544 that causes the clean-up module 934 to periodically wake-up and scan for tombstone markers.

Upon identifying the tombstone marker for the VnicSet1 on the worker node, the clean-up module may acquire a node lock (962) for the worker node. After acquiring the node lock, the clean-up module 934 may check the presence of an attach lock on the worker node (965). If the clean-up module 934 detects the presence of an attach lock on the worker node, the clean-up module 934 may release the node lock to allow the main reconciler module 932 to perform attach actions on the worker node. However, if there is not an attach lock on the worker node, the clean-up module 934 may proceed with performing the respective detach actions.

As shown, upon acquiring the node lock and the attach lock for the worker node, the clean-up module 934 may generate and send a first detach request (972A) to detach the first Vnic1 of the first VnicSet1 from the worker node to OpenStack 936. Again, the clean-up module 934 may perform each action individually to avoid Vnic leakage. As such, the clean-up module 934 may periodically check OpenStack 936 to see if the first request is completed. Upon completion of the first request, the clean-up module 934 may validate that the first detach request (974A) is completed.

Before continuing on to the next detach request, however, the clean-up module 934 may check for the presence of an attach lock on the worker node. As will be described in greater detail with respect to FIG. 10, if an attach action is identified by the main reconciler module 932 at some point after the clean-up module 934 transmits the first detach request, the main reconciler module 932 may acquire the attach lock for the worker node to notify the clean-up module 934 of the attach action. As such, if the clean-up module 934 detects the attach lock on the worker node, the clean-up module 934 may release the node lock to allow the attach action to be performed before continuing onto the next detach action.

In the illustrated example, however, the clean-up module 934 does not detect any attach locks on the worker node, and as such, transmits the second detach request (972B) to detach the second Vnic2 in the first Vnicset1 from the worker node to OpenStack 936. Once the clean-up module 934 validates the second detach requestion (974B), the clean-up module 934 may release the node lock 976. And if there are no further tombstone markers detected by the clean-up module 934, the module may return to a sleep state.

Figure 10:
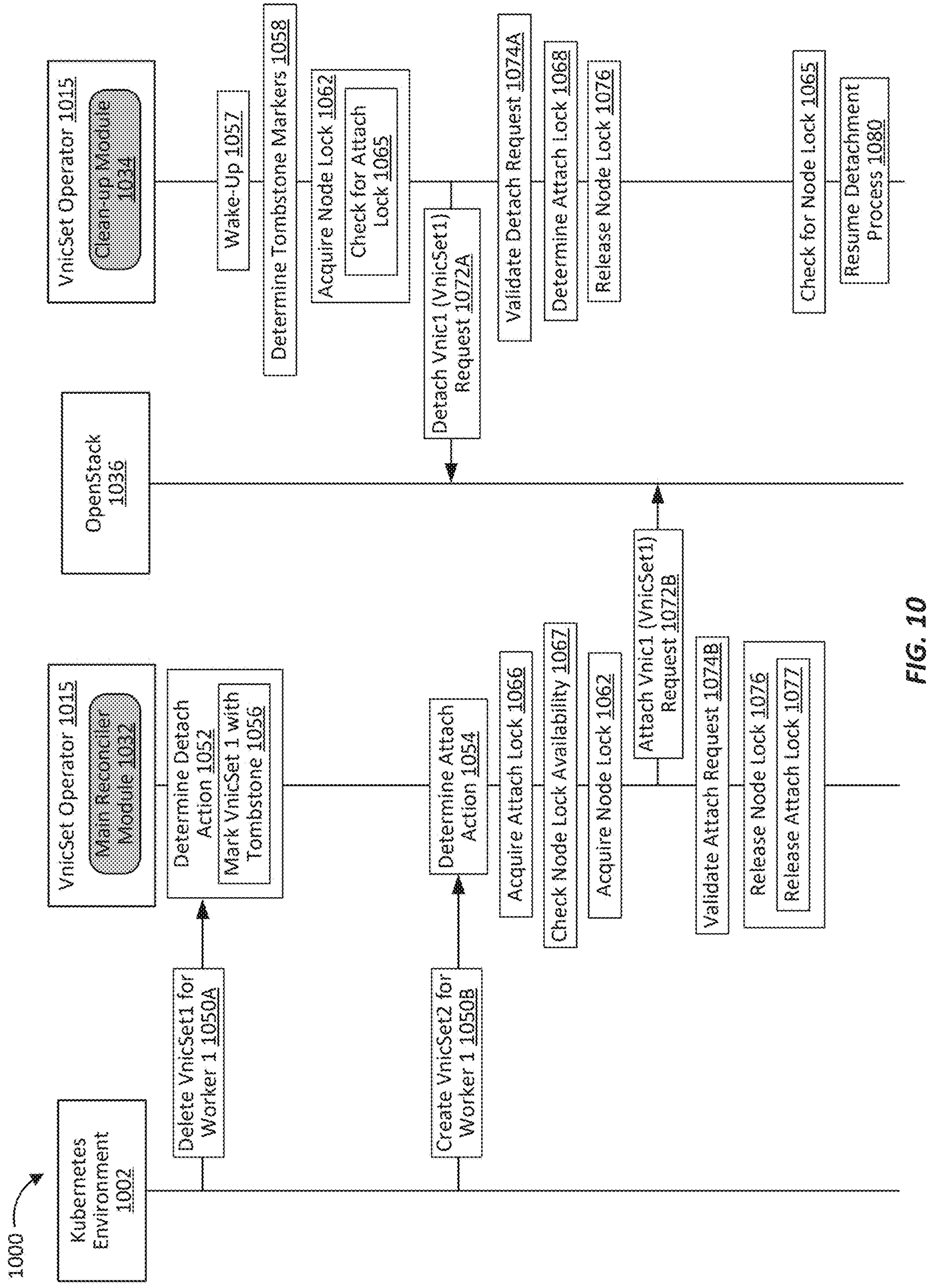
FIG. 10 illustrates another example operational flow illustrating one or more functions of a VnicSet operator, according to an embodiment herein.

Referring now to FIG. 10, an example operational flow 1000 illustrating one or more functions of a VnicSet operator 1015 is provided, according to an embodiment herein. In particular, the illustrated flow 1000 may exemplify a reconciler engine including a main reconciler module 932 and a clean-up module 934 coordinating multiple reconciliation actions for a single worker node. The main reconciler module 1032 may be the same or similar to the main reconciler module 532, the clean-up module 1034 may be the same or similar to the clean-up module 534, and both modules 1032 and 1034 may be part of a reconciler engine (not shown), such as the reconciler engine 530. As described above, the reconciler engine may be part of a VnicSet operator 1015, which may be the same or similar to the VnicSet operator 515.

As shown, the VnicSet operator 1015 may receive or determine a delete event (1050A) from a Kubernetes Environment 1002. The delete event may be to delete a VnicSet1 from a worker node, such as the worker node 426A. The VnicSet1 may include multiple Vnics, such as a first Vnic1 and a second Vnic2. Responsive to identifying the delete event, the VnicSet operator 1015 may determine one or more respective reconciliation actions. In particular, the main reconciler module 1032 may determine a detach action (1052) for each of the Vnics within the VnicSet1, and as such, mark the VnicSet1 with a tombstone marker (1056).

At a subsequent time, the clean-up module 1034 may wake-up (1057) and determine whether any worker nodes are marked with tombstone markers (1058). Upon identifying the tombstone marker for the VnicSet1 on the worker node, the clean-up module may acquire a node lock (1062) for the worker node. After acquiring the node lock, the clean-up module 1034 may check the presence of an attach lock on the worker node (1065). Responsive to not detecting an attach lock on the worker node, the clean-up module 1034 may generate and send a first detach request (1072A) to detach the first Vnic1 of the first VnicSet1 from the worker node to OpenStack 1036.

As shown, the VnicSet operator 1015 may receive a create event (1050B) for creating a second VnicSet 2 on the worker node at a time during which the clean-up module 1034 is performing the first detach action. Responsive to receiving the create event, the VnicSet operator 1015 may determine a respective attach action (1054) for a first Vnic within the second VnicSet2. To perform the attach action, the main reconciler module 1032 may acquire an attach lock (1066) for the worker node. However, since the clean-up module 1034 is performing the first detach action, the node lock may be unavailable. As such, the main reconciler module 1032 may check the node lock availability (1067) and be unable to acquire the node lock due to the on-going detach action.

Once the clean-up module 1034 validates that the first detach request was serviced (1074A), the clean-up module 1034 may check to see if there is an attach lock on the worker node before continuing onto the subsequent detach actions. Here, the clean-up module 1034 determines the presence of an attach lock on the worker node (1068), and as such releases the node lock (1076) to allow the main reconciler module 1032 to perform the attach action on the worker node. Once the node lock is released by the clean-up module 1034, the main reconciler module 1032 may acquire the node lock (1062) and transmit an attach request (1072B) to attach the Vnic1 of the second VnicSet2 to the worker node.

Responsive to validating the attach request (1074B), the main reconciler module 1032 may release the node lock (1076) and release the attach lock (1077) on the worker node. Once the node lock is released, the clean-up module 1034 may resume the detachment process (1080). For example, the clean-up module 1034 may periodically check the node lock availability for the worker node (1065) and once its available, acquire the node lock and continue with generating and transmitting the subsequent detach requests. In between each detach action, once a detach request is validated, the clean-up module 1034 may check for the presence of the attach lock on the worker node to ensure that attach actions are prioritized. As described above, by prioritizing attach actions over detach actions, the reconciler engine provides quicker application loading, restarts, and scaling, thereby improving the user experience and system performance.

Figure 11:
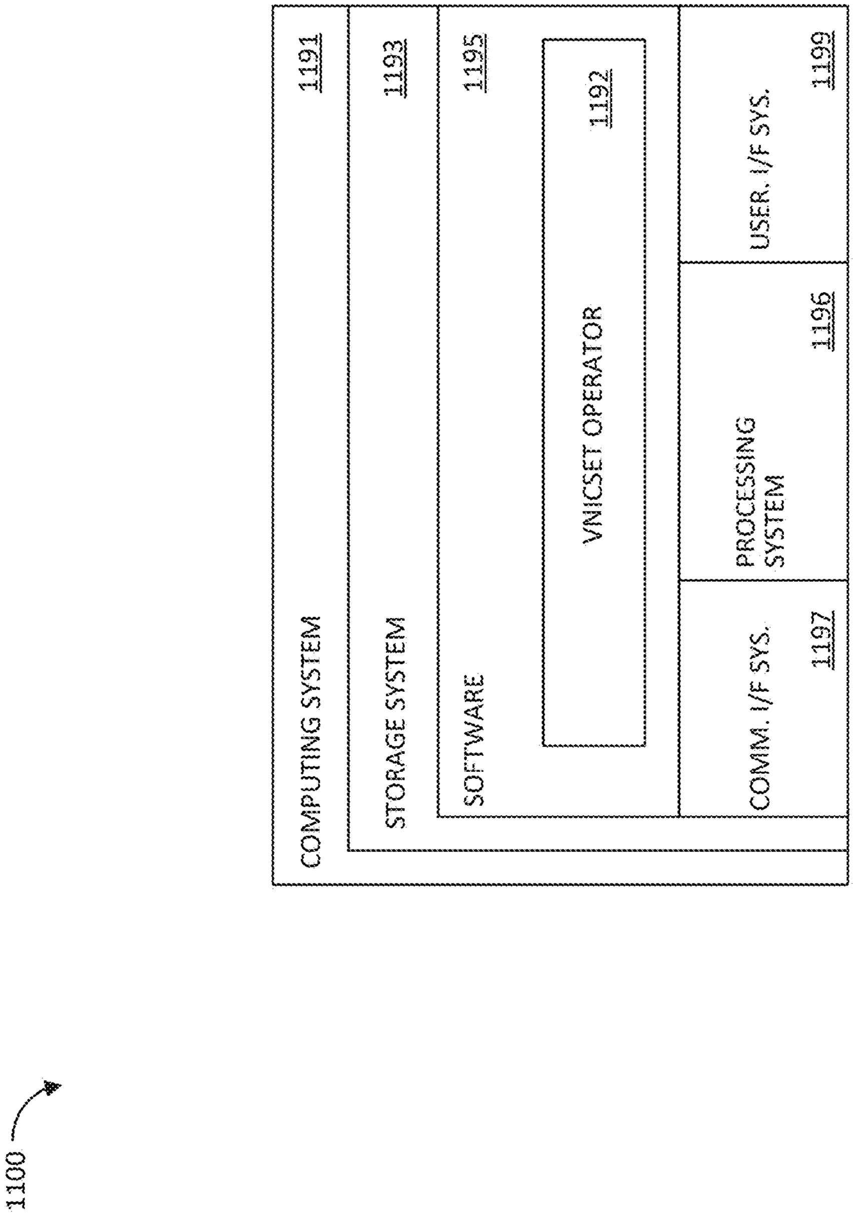
FIG. 11 shows an example computing device suitable for providing a VnicSet operator containing a reconciler engine and its related functions, according to an embodiment herein.

Referring now to FIG. 11, a diagram of a system 1100 configured to implement an VnicSet operator including a reconciler engine is provided, according to an embodiment herein. The system 1100 may be an example of an apparatus including a computing apparatus 1191 that is representative of any system or collection of systems in which the various processes, systems, programs, services, and scenarios disclosed herein may be implemented. For example, computing apparatus 1191 may be an example VnicSet operator, such as the VnicSet operator 315, 415, 515, 715, 815, 915, or 1015, an example of a reconciler engine, such as the reconciler engine 430 or 530, or any of the subcomponents depicted in systems 200, 300, 400, or 500 of FIGS. 2-5, respectively. Examples of computing apparatus 1191 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing apparatus 1191 may be implemented as a single apparatus, system, or device or may be implemented in a distributed manner as multiple apparatuses, systems, or devices. Computing apparatus 1191 may include, but is not limited to, processing system 1196, storage system 1193, software 1195, communication interface system 1197, and user interface system 1199. Processing system 1196 may be operatively coupled with storage system 1193, communication interface system 1197, and user interface system 1199.

Processing system 1196 may load and execute software 1195 from storage system 1193. Software 1195 may include a VnicSet operator 1192, which may be representative of any of the operations for providing a VnicSet operator or any of its related functions, as discussed with respect to the preceding figures. When executed by processing system 1196, software 1195 may direct processing system 1196 to operate as described herein for at least the various processes, such as the flows 600, 700, 800, 900, or 1000, operational scenarios, and sequences discussed in the foregoing implementations. Computing apparatus 1191 may optionally include additional devices, features, or functionality not discussed for purposes of brevity.

In some embodiments, processing system 1196 may comprise a micro-processor and other circuitry that retrieves and executes software 1195 from storage system 1193. Processing system 1196 may be implemented within a single processing device but may also be distributed across multiple processing devices or sub-systems that cooperate in executing program instructions. Examples of processing system 1196 may include general purpose central processing units, graphical processing units, application specific processors, and logic devices, as well as any other type of processing device, combinations, or variations thereof.

Storage system 1193 may comprise any memory device or computer-readable storage medium readable by processing system 1196 and capable of storing software 1195. Storage system 1193 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage medium a propagated signal.

In addition to computer-readable storage medium, in some implementations storage system 1193 may also include computer readable communication media over which at least some of software 1195 may be communicated internally or externally. Storage system 1193 may be implemented as a single storage device but may also be implemented across multiple storage devices or sub-systems co-located or distributed relative to each other. Storage system 1193 may comprise additional elements, such as a controller, capable of communicating with processing system 1196 or possibly other systems.

Software 1195 (including the VnicSet operator 1192 among other functions) may be implemented in program instructions that may, when executed by processing system 1196, direct processing system 1196 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1195 may include additional processes, programs, or components, such as operating system software, virtualization software, or other application software. Software 1195 may also comprise firmware or some other form of machine-readable processing instructions executable by processing system 1196.

In general, software 1195 may, when loaded into processing system 1196 and executed, transform a suitable apparatus, system, or device (of which computing apparatus 1191 is representative) overall from a general-purpose computing system into a special-purpose computing system as described herein. Indeed, encoding software 1195 on storage system 1193 may transform the physical structure of storage system 1193. The specific transformation of the physical structure may depend on various factors in different implementations of this description. Examples of such factors may include, but are not limited to, the technology used to implement the storage media of storage system 1193 and whether the computer-storage media are characterized as primary or secondary storage, as well as other factors.

For example, if the computer-readable storage medium is implemented as semiconductor-based memory, software 1195 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1197 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing apparatus 1191 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing an VnicSet operator containing a reconciler engine or one or more of its related functions. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for" but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a VnicSet operator system, comprising: one or more processors; a memory having stored thereon instructions that, upon execution by the one or more processors, cause the one or more processors to implement a process to manage a plurality of virtual network interface controllers (Vnics) on an application pod of a containerized software environment, the Vnic being directly reachable from a network external to the containerized software environment, the process including: determine, by a reconciler engine, one or more reconciliation actions for one or more Vnics within the plurality of Vnics; determine, by the reconciler engine, a first reconciliation action of the one or more reconciliation actions for a first worker node; acquire, by the reconciler engine, a node lock for the first worker node associated with the first reconciliation action; and transmit, by the reconciler engine, a first reconciliation action request to a cloud provider, wherein the cloud provider performs the first reconciliation action responsive to receiving the first reconciliation action request.

Example 2 is the VnicSet operator system of any previous or subsequent Example, wherein the reconciler engine comprises a main reconciler module and a clean-up module, and wherein the instructions to acquire, by the reconciler engine, the node lock for the first worker node associated with the first reconciliation action, upon execution, further cause the one or more processors to: acquiring, by the main reconciler module, the node lock for the first worker node associated with the first reconciliation action, wherein acquisition of the node lock by the main reconciler module prevents the clean-up module from performing actions on the first worker node.

Example 3 is the VnicSet operator system of any previous or subsequent Example, wherein the instructions to determine, by the reconciler engine, the first reconciliation action associated with the first worker node, upon execution, further cause the one or more processors to: determine, by a main reconciler module of the reconciler engine, that the first reconciliation action comprises a detach action for a first Vnic associated with the first worker node; and mark, by the main reconciler module, the first Vnic with a tombstone marker.

Example 4 is the VnicSet operator system of any previous or subsequent Example, wherein: the reconciler engine comprises a main reconciler module and a clean-up module; the instructions to determine, by the reconciler engine, the first reconciliation action associated with the first worker node, upon execution, further cause the one or more processors to: identify, by the clean-up module, a first tombstone marker on a first Vnic; and determine, by the clean-up module, a detach action for the first Vnic from the first worker node based on the first tombstone marker; and the instructions to acquire, by the reconciler engine, the node lock for the first worker node associated with the first reconciliation action, upon execution, further cause the one or more processors to: acquire, by the clean-up module, the node lock for the first worker node based on the first tombstone marker on the first Vnic, wherein the node lock prevents the main reconciler module from performing actions on the first worker node.

Example 5 is the VnicSet operator system of any previous or subsequent Example, wherein: the reconciler engine comprises a main reconciler module and a clean-up module; the instructions to determine, by the reconciler engine, the first reconciliation action associated with the first worker node, upon execution, further cause the one or more processors to: determine, by the main reconciler module, that the first reconciliation action comprises an attach action for a first Vnic onto the first worker node; and the instructions to acquire, by the reconciler engine, the node lock for the first worker node associated with the first reconciliation action, upon execution, further cause the one or more processors to: acquire, by the main reconciler module, an attach lock for the first worker node based on the first reconciliation action comprising the attach action of the first Vnic onto the first worker node; and acquire, by the main reconciler module, the node lock for the first worker node based on the attach action, wherein the node lock prevents the clean-up module from performing actions on the first worker node.

Example 6 is the VnicSet operator system of any previous or subsequent Example, wherein the instructions to acquire, by the reconciler engine, the node lock for the first worker node associated with the first reconciliation action, upon execution, further cause the one or more processors to: acquire, by a clean-up module of the reconciler engine, the node lock for the first worker node; subsequently determine, by the clean-up module, an attach lock for the first worker node; and release, by the clean-up module, the node lock for the first worker node.

Example 7 is the VnicSet operator system of any previous or subsequent Example, wherein the instructions to determine, by the reconciler engine, the first reconciliation action associated with the first worker node, upon execution, further cause the one or more processors to: determine, by a clean-up module of the reconciler engine, a lack of tombstone markers on the plurality of Vnics at a first time, wherein a tombstone marker indicates a detach action for a respective Vnic; return, by the clean-up module, to a sleep state based on the lack of tombstone markers; wake, by the clean-up module, at a second time to check for tombstone markers on the plurality of Vnics; and determine, by the clean-up module, a first tombstone marker on a first Vnic in the plurality of Vnics, wherein the first tombstone marker indicates a first detach action for the first Vnic.

Example 8 is a method for managing a plurality of virtual network interface controllers (Vnics) on an application pod within a containerized software environment, each of the plurality of Vnics being directly reachable from a network external to the containerized software environment, the method comprising: determining, by a reconciler engine, one or more reconciliation actions for one or more Vnics within the plurality of Vnics; determining, by the reconciler engine, a first reconciliation action of the one or more reconciliation actions for a first worker node; acquiring, by the reconciler engine, a node lock for the first worker node associated with the first reconciliation action; and transmitting, by the reconciler engine, a first reconciliation action request to a cloud provider, wherein the cloud provider performs the first reconciliation action responsive to receiving the first reconciliation action request.

Example 9 is the method of any previous or subsequent Example, wherein the reconciler engine comprises a main reconciler module and a clean-up module, and acquiring, by the reconciler engine, the node lock for the first worker node associated with the first reconciliation action comprises at least one of: acquiring, by the main reconciler module, the node lock for the first worker node associated with the first reconciliation action, wherein acquisition of the node lock by the main reconciler module prevents the clean-up module from performing actions on the first worker node; or acquiring, by the clean-up module, the node lock for the first worker node associated with the first reconciliation action, wherein acquisition of the node lock by the clean-up module prevents the main reconciler module from performing actions on the first worker node.

Example 10 is the method of any previous or subsequent Example, wherein determining, by the reconciler engine, the first reconciliation action of the one or more reconciliation actions for the first worker node comprises: determining, by a main reconciler module of the reconciler engine, that the first reconciliation action comprises a detach action for a first Vnic associated with the first worker node; and marking, by the main reconciler module, the first Vnic with a tombstone marker.

Example 11 is the method of any previous or subsequent Example, wherein determining, by the reconciler engine, the one or more reconciliation actions for one or more Vnics within the plurality of Vnics comprises: determining, by a main reconciler module of the reconciler engine, that the first reconciliation action comprises an attach action for a first Vnic onto the first worker node; and acquiring, by the reconciler engine, the node lock for the first worker node associated with the first reconciliation action further comprises: acquiring, by the main reconciler module, an attach lock for the first worker node based on the first reconciliation action comprising the attach action; and acquiring, by the main reconciler module, the node lock for the first worker node.

Example 12 is the method of any previous or subsequent Example, wherein determining, by the reconciler engine, the first reconciliation action of the one or more reconciliation actions for the first worker node comprises: checking, by a clean-up module of the reconciler engine, the plurality of Vnics for tombstone markers, wherein a tombstone marker indicates a detach action for a respective Vnic; determining, by the clean-up module, a lack of tombstone markers on the plurality of Vnics; and returning, by the clean-up module, to a sleep state based on the lack of tombstone markers.

Example 13 is the method of any previous or subsequent Example, wherein: determining, by the reconciler engine, the first reconciliation action associated with the first worker node comprises: determining, by a clean-up module of the reconciler engine, a first detach action for a first Vnic from the first worker node; acquiring, by the reconciler engine, the node lock for the first worker node associated with the first reconciliation action comprises: acquiring, by the clean-up module, the node lock for the first worker node; and subsequently determining, by the clean-up module, an attach lock for the first worker node; and releasing, by the clean-up module, the node lock for the first worker node.

Example 14 is the method of any previous or subsequent Example, wherein the containerized software environment comprises a Kubernetes cluster.

Example 15 is the method of any previous or subsequent Example, wherein the method further comprises: validating, by the reconciler engine, that the cloud provider performed the first reconciliation action; and releasing, by the reconciler engine, the node lock for the first worker node responsive to validation of the first reconciliation action.

Example 16 is a computer-readable storage medium comprising processor-executable instructions, wherein the processor-executable instructions comprise a virtual network interface controller (Vnic) operator that manages a plurality of Vnics on an application pod of a containerized software environment, each of the plurality of Vnics being directly reachable from a network external to the containerized software environment, wherein the Vnic operator is configured to cause one or more processors to: determine, by a reconciler engine, one or more reconciliation actions for one or more Vnics within the plurality of Vnics; determine, by the reconciler engine, a first reconciliation action of the one or more reconciliation actions for a first worker node; acquire, by the reconciler engine, a node lock for the first worker node associated with the first reconciliation action; and transmit, by the reconciler engine, a first reconciliation action request to a cloud provider, wherein the cloud provider performs the first reconciliation action responsive to receiving the first reconciliation action request.

Example 17 is the computer-readable storage medium of any previous or subsequent Example, wherein the processor-executable instructions of the Vnic operator to determine, by the reconciler engine, the first reconciliation action associated with the first worker node cause the one or more processors to further execute processor-executable instructions stored in the computer-readable storage medium to: determine, by a main reconciler module of the reconciler engine, that the first reconciliation action comprises a detach action for a first Vnic associated with the first worker node; and mark, by the main reconciler module, the first Vnic with a first tombstone marker.

Example 18 is the computer-readable storage medium of any previous or subsequent Example, wherein: the reconciler engine comprises a main reconciler module and a clean-up module; the processor-executable instructions of the Vnic operator to determine, by the reconciler engine, the first reconciliation action associated with the first worker node cause the one or more processors to further execute processor-executable instructions stored in the computer-readable storage medium to: identify, by the clean-up module, a first tombstone marker on a first Vnic; and determine, by the clean-up module, a detach action for the first Vnic from the first worker node based on the first tombstone marker; and the processor-executable instructions of the Vnic operator to acquire, by the reconciler engine, the node lock for the first worker node associated with the first reconciliation action cause the one or more processors to further execute processor-executable instructions stored in the computer-readable storage medium to: acquire, by the clean-up module, the node lock for the first worker node based on the first tombstone marker on the first Vnic, wherein acquisition of the node lock by the clean-up module prevents the main reconciler module from perform actions on the first worker node.

Example 19 is the computer-readable storage medium of any previous or subsequent Example, wherein the processor-executable instructions cause the one or more processors to further execute processor-executable instructions stored in the computer-readable storage medium to: validate, by the reconciler engine, that the cloud provider performed the first reconciliation action; and release, by the reconciler engine, the node lock for the first worker node responsive to validation of the first reconciliation action.

Example 20 is the computer-readable storage medium of any previous or subsequent Example, wherein the processor-executable instructions of the Vnic operator to acquire, by the reconciler engine, the node lock for the first worker node associated with the first reconciliation action cause the one or more processors to further execute processor-executable instructions stored in the computer-readable storage medium to: acquire, by a clean-up module of the reconciler engine, the node lock for the first worker node; subsequently determine, by the clean-up module, an attach lock for the first worker node; and release, by the clean-up module, the node lock for the first worker node.

What is claimed is:

1. A VnicSet operator system, comprising:

one or more processors;

a memory having stored thereon instructions that, upon execution by the one or more processors, cause the one or more processors to implement a process to manage a plurality of virtual network interface controllers (Vnics) on an application pod of a containerized software environment, the Vnic being directly reachable from a network operatively coupled to a cloud environment external to the containerized software environment, the process including:

determine, by a reconciler engine within the VnicSet operator system, one or more reconciliation actions for one or more Vnics within the plurality of Vnics, wherein the one or more reconciliation actions modify one or more container-orchestration resources within the containerized software environment that are associated with the one or more application pods, such that a desired state maintained by the containerized software environment corresponds to a current state of external network resources within the cloud environment;

determine, by the reconciler engine, a first reconciliation action of the one or more reconciliation actions for a first worker node;

acquire, by the reconciler engine, a node lock for the first worker node associated with the first reconciliation action; and transmit, by the reconciler engine, a first reconciliation action request to a cloud provider, wherein the cloud provider performs the first reconciliation action on the first worker node responsive to receiving the first reconciliation action request.

2. The VnicSet operator system of claim 1, wherein the reconciler engine comprises a main reconciler module and a clean-up module, and wherein the instructions to acquire, by the reconciler engine, the node lock for the first worker node associated with the first reconciliation action, upon execution, further cause the one or more processors to:

acquiring, by the main reconciler module, the node lock for the first worker node associated with the first reconciliation action, wherein acquisition of the node lock by the main reconciler module prevents the clean-up module from performing actions on the first worker node.

3. The VnicSet operator system of claim 1, wherein the instructions to determine, by the reconciler engine, the first reconciliation action associated with the first worker node, upon execution, further cause the one or more processors to:

determine, by a main reconciler module of the reconciler engine, that the first reconciliation action comprises a detach action for a first Vnic associated with the first worker node; and mark, by the main reconciler module, the first Vnic with a tombstone marker.

4. The VnicSet operator system of claim 1, wherein:

the reconciler engine comprises a main reconciler module and a clean-up module;

the instructions to determine, by the reconciler engine, the first reconciliation action associated with the first worker node, upon execution, further cause the one or more processors to:

identify, by the clean-up module, a first tombstone marker on a first Vnic; and determine, by the clean-up module, a detach action for the first Vnic from the first worker node based on the first tombstone marker; and the instructions to acquire, by the reconciler engine, the node lock for the first worker node associated with the first reconciliation action, upon execution, further cause the one or more processors to:

acquire, by the clean-up module, the node lock for the first worker node based on the first tombstone marker on the first Vnic, wherein the node lock prevents the main reconciler module from performing actions on the first worker node.

5. The VnicSet operator system of claim 1, wherein:

the reconciler engine comprises a main reconciler module and a clean-up module;

the instructions to determine, by the reconciler engine, the first reconciliation action associated with the first worker node, upon execution, further cause the one or more processors to:

determine, by the main reconciler module, that the first reconciliation action comprises an attach action for a first Vnic onto the first worker node; and the instructions to acquire, by the reconciler engine, the node lock for the first worker node associated with the first reconciliation action, upon execution, further cause the one or more processors to:

acquire, by the main reconciler module, an attach lock for the first worker node based on the first reconciliation action comprising the attach action of the first Vnic onto the first worker node; and acquire, by the main reconciler module, the node lock for the first worker node based on the attach action, wherein the node lock prevents the clean-up module from performing actions on the first worker node.

6. The VnicSet operator system of claim 1, wherein the instructions to acquire, by the reconciler engine, the node lock for the first worker node associated with the first reconciliation action, upon execution, further cause the one or more processors to:

acquire, by a clean-up module of the reconciler engine, the node lock for the first worker node;

subsequently determine, by the clean-up module, an attach lock for the first worker node; and release, by the clean-up module, the node lock for the first worker node.

7. The VnicSet operator system of claim 1, wherein the instructions to determine, by the reconciler engine, the first reconciliation action associated with the first worker node, upon execution, further cause the one or more processors to:

determine, by a clean-up module of the reconciler engine, a lack of tombstone markers on the plurality of Vnics at a first time, wherein a tombstone marker indicates a detach action for a respective Vnic;

return, by the clean-up module, to a sleep state based on the lack of tombstone markers;

wake, by the clean-up module, at a second time to check for tombstone markers on the plurality of Vnics; and determine, by the clean-up module, a first tombstone marker on a first Vnic in the plurality of Vnics, wherein the first tombstone marker indicates a first detach action for the first Vnic.

8. A method for managing a plurality of virtual network interface controllers (Vnics) on an application pod within a containerized software environment, each of the plurality of Vnics being directly reachable from a network operatively coupled to a cloud environment external to the containerized software environment, the method comprising:

determining, by a reconciler engine, one or more reconciliation actions for one or more Vnics within the plurality of Vnics, where the one or more reconciliation actions modify one or more container-orchestration resources within the containerized software environment that are associated with the one or more application pods, such that a desired state maintained by the containerized software environment corresponds to a current state of external network resources within the cloud environment;

determining, by the reconciler engine, a first reconciliation action of the one or more reconciliation actions for a first worker node;

acquiring, by the reconciler engine, a node lock for the first worker node associated with the first reconciliation action; and transmitting, by the reconciler engine, a first reconciliation action request to a cloud provider, wherein the cloud provider performs the first reconciliation action on the first worker node responsive to receiving the first reconciliation action request.

9. The method of claim 8, wherein the reconciler engine comprises a main reconciler module and a clean-up module, and acquiring, by the reconciler engine, the node lock for the first worker node associated with the first reconciliation action comprises at least one of:

acquiring, by the main reconciler module, the node lock for the first worker node associated with the first reconciliation action, wherein acquisition of the node lock by the main reconciler module prevents the clean-up module from performing actions on the first worker node; or acquiring, by the clean-up module, the node lock for the first worker node associated with the first reconciliation action, wherein acquisition of the node lock by the clean-up module prevents the main reconciler module from performing actions on the first worker node.

10. The method of claim 8, wherein determining, by the reconciler engine, the first reconciliation action of the one or more reconciliation actions for the first worker node comprises:

determining, by a main reconciler module of the reconciler engine, that the first reconciliation action comprises a detach action for a first Vnic associated with the first worker node; and marking, by the main reconciler module, the first Vnic with a tombstone marker.

11. The method of claim 8, wherein determining, by the reconciler engine, the one or more reconciliation actions for one or more Vnics within the plurality of Vnics comprises:

determining, by a main reconciler module of the reconciler engine, that the first reconciliation action comprises an attach action for a first Vnic onto the first worker node; and acquiring, by the reconciler engine, the node lock for the first worker node associated with the first reconciliation action further comprises:

acquiring, by the main reconciler module, an attach lock for the first worker node based on the first reconciliation action comprising the attach action; and acquiring, by the main reconciler module, the node lock for the first worker node.

12. The method of claim 8, wherein determining, by the reconciler engine, the first reconciliation action of the one or more reconciliation actions for the first worker node comprises:

checking, by a clean-up module of the reconciler engine, the plurality of Vnics for tombstone markers, wherein a tombstone marker indicates a detach action for a respective Vnic;

determining, by the clean-up module, a lack of tombstone markers on the plurality of Vnics; and returning, by the clean-up module, to a sleep state based on the lack of tombstone markers.

13. The method of claim 8, wherein:

determining, by the reconciler engine, the first reconciliation action associated with the first worker node comprises:

determining, by a clean-up module of the reconciler engine, a first detach action for a first Vnic from the first worker node;

acquiring, by the reconciler engine, the node lock for the first worker node associated with the first reconciliation action comprises:

acquiring, by the clean-up module, the node lock for the first worker node; and subsequently determining, by the clean-up module, an attach lock for the first worker node; and releasing, by the clean-up module, the node lock for the first worker node.

14. The method of claim 8, wherein the containerized software environment comprises a Kubernetes cluster.

15. The method of claim 8, wherein the method further comprises:

validating, by the reconciler engine, that the cloud provider performed the first reconciliation action; and releasing, by the reconciler engine, the node lock for the first worker node responsive to validation of the first reconciliation action.

16. A computer-readable storage medium comprising processor-executable instructions, wherein the processor-executable instructions comprise a virtual network interface controller (Vnic) operator that manages a plurality of Vnics on an application pod of a containerized software environment, each of the plurality of Vnics being directly reachable from a network operatively coupled to a cloud environment external to the containerized software environment, wherein the Vnic operator is configured to cause one or more processors to:

determine, by a reconciler engine, one or more reconciliation actions for one or more Vnics within the plurality of Vnics, wherein the one or more reconciliation actions modify one or more container-orchestration resources within the containerized software environment that are associated with the one or more application pods, such that a desired state maintained by the containerized software environment corresponds to a current state of external network resources within the cloud environment;

determine, by the reconciler engine, a first reconciliation action of the one or more reconciliation actions for a first worker node;

acquire, by the reconciler engine, a node lock for the first worker node associated with the first reconciliation action; and transmit, by the reconciler engine, a first reconciliation action request to a cloud provider, wherein the cloud provider performs the first reconciliation action responsive to receiving the first reconciliation action request.

17. The computer-readable storage medium of claim 16, wherein the processor-executable instructions of the Vnic operator to determine, by the reconciler engine, the first reconciliation action associated with the first worker node cause the one or more processors to further execute processor-executable instructions stored in the computer-readable storage medium to:

determine, by a main reconciler module of the reconciler engine, that the first reconciliation action comprises a detach action for a first Vnic associated with the first worker node; and mark, by the main reconciler module, the first Vnic with a first tombstone marker.

18. The computer-readable storage medium of claim 16, wherein:

the reconciler engine comprises a main reconciler module and a clean-up module;

the processor-executable instructions of the Vnic operator to determine, by the reconciler engine, the first reconciliation action associated with the first worker node cause the one or more processors to further execute processor-executable instructions stored in the computer-readable storage medium to:

identify, by the clean-up module, a first tombstone marker on a first Vnic; and determine, by the clean-up module, a detach action for the first Vnic from the first worker node based on the first tombstone marker; and the processor-executable instructions of the Vnic operator to acquire, by the reconciler engine, the node lock for the first worker node associated with the first reconciliation action cause the one or more processors to further execute processor-executable instructions stored in the computer-readable storage medium to:

acquire, by the clean-up module, the node lock for the first worker node based on the first tombstone marker on the first Vnic, wherein acquisition of the node lock by the clean-up module prevents the main reconciler module from perform actions on the first worker node.

19. The computer-readable storage medium of claim 16, wherein the processor-executable instructions cause the one or more processors to further execute processor-executable instructions stored in the computer-readable storage medium to:

validate, by the reconciler engine, that the cloud provider performed the first reconciliation action; and release, by the reconciler engine, the node lock for the first worker node responsive to validation of the first reconciliation action.

20. The computer-readable storage medium of claim 16, wherein the processor-executable instructions of the Vnic operator to acquire, by the reconciler engine, the node lock for the first worker node associated with the first reconciliation action cause the one or more processors to further execute processor-executable instructions stored in the computer-readable storage medium to:

acquire, by a clean-up module of the reconciler engine, the node lock for the first worker node;

subsequently determine, by the clean-up module, an attach lock for the first worker node; and release, by the clean-up module, the node lock for the first worker node.

* * * * *